(12) United States Patent
Hasegawa et al.

(10) Patent No.: US 7,834,551 B2
(45) Date of Patent: Nov. 16, 2010

(54) PLASMA DISPLAY PANEL AND METHOD OF PRODUCING THE SAME

(75) Inventors: Shinya Hasegawa, Osaka (JP); Osamu Inoue, Osaka (JP); Seiji Toyoda, Osaka (JP); Akira Kawase, Osaka (JP); Yasuhiko Nakada, Osaka (JP); Kazuhiro Yokota, Hyogo (JP); Tsutomu Koshizuka, Osaka (JP)

(73) Assignee: Panasonic Corporation, Osaka (JP)

( * ) Notice: Subject to any disclaimer, the term of this patent is extended or adjusted under 35 U.S.C. 154(b) by 1050 days.

(21) Appl. No.: 11/555,495

(22) Filed: Nov. 1, 2006

(65) Prior Publication Data

US 2007/0052361 A1 Mar. 8, 2007

Related U.S. Application Data

(63) Continuation of application No. PCT/JP2006/307150, filed on Apr. 4, 2006.

(30) Foreign Application Priority Data

Apr. 4, 2005 (JP) ............................. 2005-107240

(51) Int. Cl.
*H01J 17/49* (2006.01)
(52) U.S. Cl. ....................................... 313/586; 313/587
(58) Field of Classification Search .......... 313/582–587
See application file for complete search history.

(56) References Cited

U.S. PATENT DOCUMENTS 6,787,239 B2 9/2004 Fujii et al.

2006/0019814 A1 1/2006 Baik et al.

FOREIGN PATENT DOCUMENTS

| JP | 2001-139345 | 5/2001 |
|----|-------------|--------|
| JP | 2001-151532 | 6/2001 |
| JP | 2001-151532 A | 6/2001 |
| JP | 2001-172046 | 6/2001 |
| JP | 2001-172046 A | 6/2001 |
| JP | 2002-25341 | 1/2002 |
| JP | 2002-362941 | 12/2002 |
| JP | 2003-104753 A | 4/2003 |
| JP | 2003-128430 | 5/2003 |
| JP | 2003-128430 A | 5/2003 |
| JP | 2003-151448 A | 5/2003 |
| JP | 2003-335550 | 11/2003 |
| JP | 2004-095319 A | 3/2004 |

OTHER PUBLICATIONS

Specification for co-pending U.S. Appl. No. 11/465,046, filed Aug. 16, 2006.
J.E. Shelby et al., "Colloidal Silver Formation at the Surface of Float Glass", Journal or Non-Crystalline Solids, vol. 50, 1982, pp. 107-117.

*Primary Examiner*—Joseph L Williams
(74) *Attorney, Agent, or Firm*—Hamre, Schumann, Mueller & Larson, P.C.

(57) ABSTRACT

A plasma display panel of the present invention includes display electrodes and address electrodes that cross each other. The electrode to be covered with the first dielectric layer contains at least one selected from silver and copper. The first glass contains $Bi_2O_3$. The first glass further contains 0 to 4 wt % of $MoO_3$ and 0 to 4 wt % of $WO_3$, and the total of the contents of $MoO_3$ and $WO_3$ that are contained in the first glass is in a range of 0.1 to 8 wt %. The first glass may contain, as components thereof: 0 to 15 wt % $SiO_2$; 10 to 50 wt % $B_2O_3$; 15 to 50 wt % ZnO; 0 to 10 wt % $Al_2O_3$; 2 to 40 wt % $Bi_2O_3$; 0 to 5 wt % MgO; 5 to 38 wt % CaO+SrO+BaO; 0 to 4 wt % $MoO_3$; and 0 to 4 wt % $WO_3$, and the total of the contents of $MoO_3$ and $WO_3$ that are contained in the first glass is in the range of 0.1 to 8 wt %.

24 Claims, 4 Drawing Sheets

PLASMA DISPLAY PANEL AND METHOD OF PRODUCING THE SAME

This application is a continuation of prior pending international application number PCT/JP2006/307150 filed Apr. 4, 2006, which designated the United States.

BACKGROUND OF THE INVENTION

1. Field of the Invention

The present invention relates to a plasma display panel and a method of producing the same.

2. Related Background Art

Recently, flat panel displays, such as plasma display panels (hereinafter also referred to as "PDPs"), FEDs, and liquid crystal displays, have been gaining attention as displays that can achieve reductions in thickness and weight.

These flat panel displays each are provided with a front panel and a back panel, each of which includes a glass substrate and components disposed thereon. The front panel and the back panel are arranged to oppose each other and the peripheries thereof are sealed.

As described above, a PDP has a configuration in which the front panel and the back panel are arranged to oppose each other and the peripheries thereof are sealed with sealing glass. The front panel includes a front glass substrate. It also includes stripe-like display electrodes that are formed on the surface thereof, as well as a dielectric layer and a protective layer that further are formed thereon. The back panel includes: a back glass substrate; stripe-like address electrodes that are formed on the surface thereof a dielectric layer that further is formed thereon; barrier ribs that are formed between adjacent address electrodes; and phosphor layers, each of which is formed between adjacent barrier ribs.

The front panel and the back panel are arranged so as to oppose each other and to allow the electrodes thereof to be orthogonal to each other. In this state, their peripheries are sealed. The sealed spaces that are formed inside are filled with a discharge gas.

Two display electrodes compose a pair of electrodes. The region defined by such a pair of display electrodes and one address electrode that cross each other three-dimensionally, with a discharge space being interposed therebetween, serves as a cell that contributes to an image display.

Hereafter, the dielectric layer of the PDP is described in detail. The dielectric layer of the PDP is required to have the following properties: higher insulation to allow it to be formed on electrodes; a lower dielectric constant to achieve lower power consumption; and a thermal expansion coefficient that matches with that of the glass substrate so that neither peeling nor cracks occur. Furthermore, in order to use the light emitted from phosphors as display light efficiently, the dielectric layer to be formed on the front glass substrate usually is required to be amorphous glass having high visible light transmissivity.

The dielectric layer is formed by applying a glass paste onto a glass substrate by, for example, screen printing and then drying and baking it. The glass paste usually contains glass powder, resin, and a solvent and also may contain an inorganic filler and an inorganic pigment in some cases. On the other hand, from the viewpoints of the price, availability, etc., generally soda lime glass produced by a float process is used as the glass substrate to be used for the PDP. Accordingly, the glass paste is baked at a temperature of 600° C. or lower so as not to cause deformation of the glass substrate.

Since the dielectric layer that is used for a PDP has to be baked at a temperature that causes no deformation of the glass substrate, it is necessary to form it with glass having a relatively low melting point. Hence, $PbO$—$SiO_2$-based glass whose main raw material is PbO is used mainly at present.

Such a dielectric layer of the PDP is formed by baking a glass paste containing resin and a solvent. Accordingly, the dielectric layer may be colored by carbon-containing impurities that remain therein, which may cause a deterioration in luminance. For the purpose of preventing such a deterioration in luminance, glass for covering transparent electrodes has been proposed that is obtained by adding $MoO_3$ or $Sb_2O_3$ to glass containing PbO (for instance, see JP2001-151532A).

Furthermore, with consideration given to environmental problems, a dielectric layer that is free from lead has been developed. For example, a dielectric layer produced using $Bi_2O_3$—$B_2O_3$—$ZnO$—$R_2O$-based glass (R:Li, Na, K) has been proposed (for instance, see JP2001-139345A). Moreover, when glass containing an alkali metal oxide is used, in order to reduce the pinholes that are produced by baking the glass on aluminum electrodes, glass that contains CuO, CoO, $MoO_3$, or NiO added thereto has been proposed (for instance, see JP2002-362941A).

As described above, the dielectric layers produced using glass that is free from lead have been proposed conventionally. In such cases, however, the dielectric layer or front glass substrate may yellow due to the alkali metal oxide or bismuth oxide that is used instead of lead to obtain a lower softening point. Conceivably, the mechanism that causes this yellowing is as follows.

Ag or Cu is used for the display electrodes to be provided on the front glass substrate and the address electrodes to be provided on the back glass substrate. The Ag or Cu may ionize and then may dissolve and diffuse in the dielectric layer and glass substrate during the baking that is carried out in forming the dielectric layer. The diffused Ag ions or Cu ions tend to be reduced by alkali metal ions or bismuth oxides that are contained in the dielectric layer or Sn ions (bivalence) contained in the front glass substrate. In that case, they will colloidize. When Ag or Cu has colloidized as described above, the dielectric layer and front glass substrate are colored yellow or brown, i.e. so-called yellowing occurs (for instance, J. E. SHELBY and J. VITKO. Jr Journal of Non-Crystalline Solids vol. 50 (1982) 107-117). Since such yellowed glass absorbs light with a wavelength of 400 nm, a PDP produced using the glass has inferior blue luminance or inferior chromaticity. Hence, yellowing is a problem, especially in the front panel. Furthermore, since Ag and Cu colloids have conductivity, they lower the withstand voltage of the dielectric layer. In addition, since Ag and Cu colloids deposit as colloidal particles that are far larger than ions, they reflect the light that passes through the dielectric layer and thereby cause the deterioration in luminance of the PDP.

SUMMARY OF THE INVENTION

The present invention is intended to provide a highly reliable plasma display panel that is provided with a dielectric layer having high withstand voltage and that prevents not only the dielectric layer and glass substrate from yellowing but also dielectric breakdown from occurring. The present invention also is intended to provide a method of producing the same.

A plasma display panel of the present invention includes a display electrode and an address electrode that cross each other. At least one selected from the display electrode and the address electrode is covered with a first dielectric layer containing first glass. The electrode to be covered with the first dielectric layer contains at least one selected from silver and copper. The first glass contains $Bi_2O_3$. The first glass further contains 0 to 4 wt % of $MoO_3$ and 0 to 4 wt % of $WO_3$, and the total of the contents of $MoO_3$ and $WO_3$ that are contained in the first glass is in a range of 0.1 to 8 wt %.

In the plasma display panel of the present invention, the first glass that is contained in the first dielectric layer contains at least one selected from $MoO_3$ and $WO_3$. Accordingly, even if Ag or Cu that commonly is used as an electrode material ionizes and then disperses in the dielectric layer, it produces a stable compound together with $MoO_3$ or $WO_3$, which prevents Ag or Cu from aggregating and colloidizing. This prevents the dielectric layer from yellowing due to the colloidization of Ag or Cu. Similarly, in the case where the electrodes are formed on a glass substrate, Ag or Cu that has dispersed in the glass substrate produces a stable compound together with $MoO_3$ or $WO_3$. Accordingly, the glass substrate also can be prevented from yellowing due to the colloidization of Ag or Cu. Furthermore, the first plasma display panel of the present invention can prevent the occurrence of not only yellowing but also other harmful effects that accompany the production of Ag or Cu colloids, for example, a decrease in withstand voltage of the dielectric layer and a deterioration in luminance of the PDP.

Moreover, in the plasma display panel of the present invention, the first glass contains $Bi_2O_3$ as a component that allows a lower melting point to be obtained. Accordingly, it is possible to form a dielectric layer that is substantially free from lead (PbO). In the present specification, the expression, "substantially free" denotes that a trace amount of the component concerned that does not affect the characteristics is allowed to be contained, specifically, the content thereof is 0.1 wt % or less, preferably 0.05 wt % or less. Hence, in the first plasma display panel of the present invention, the content of lead in the first glass can be 0.1 wt % or less, preferably 0.05 wt % or less.

Hereafter, examples of the plasma display panel of the present invention are described.

In the first example of the plasma display panel of the present invention, the first glass contains, as components thereof:

0 to 15 wt % $SiO_2$;

10 to 50 wt % $B_2O_3$;

15 to 50 wt % ZnO;

0 to 10 wt % $Al_2O_3$;

2 to 40 wt % $Bi_2O_3$;

0 to 5 wt % MgO;

5 to 38 wt % CaO+SrO+BaO;

0 to 0.1 wt % $Li_2O+Na_2O+K_2O$;

0 to 4 wt % $MoO_3$; and 0 to 4 wt % $WO_3$, and the total of the contents of $MoO_3$ and $WO_3$ that are contained in the first glass is in the range of 0.1 to 8 wt %.

In the second example of the plasma display panel of the present invention, the first glass contains, as components thereof:

0 to 2 wt % $SiO_2$;

10 to 50 wt % $B_2O_3$;

15 to 50 wt % ZnO;

0 to 10 wt % $Al_2O_3$;

2 to 40 wt % $Bi_2O_3$;

0 to 5 wt % MgO;

5 to 38 wt % CaO+SrO+BaO;

0 to 4 wt % $MoO_3$; and 0 to 4 wt % $WO_3$, and the total of the contents of $MoO_3$ and $WO_3$ that are contained in the first glass is in the range of 0.1 to 8 wt %. In this second example of the plasma display panel, the first glass further may contain, as a composition thereof, at least one selected from the group consisting of $Li_2O$, $Na_2O$, and $K_2O$. In this case, the total of the contents of $Li_2O$, $Na_2O$, and $K_2O$ that are contained in the first glass is 0.1 to 10 wt %, for example.

In the third example of the plasma display panel of the present invention, the first glass contains, as components thereof:

0 to 15 wt % $SiO_2$;

10 to 50 wt % $B_2O_3$;

15 to 50 wt % ZnO;

0 to 10 wt % $Al_2O_3$;

2 to 40 wt % $Bi_2O_3$;

0 to 5 wt % MgO;

5 to 38 wt % CaO+SrO+BaO;

0 to 4 wt % $MoO_3$; and 0 to 4 wt % $WO_3$, and the total of the contents of $MoO_3$ and $WO_3$ that are contained in the first glass is in a range of 0.1 to 8 wt %. In this third example of the plasma display panel, the first glass further may contain, as a component thereof, at least one selected from the group consisting of $Li_2O$, $Na_2O$, and $K_2O$. In this case, the total of the contents of $Li_2O$, $Na_2O$, and $K_2O$ that are contained in the first glass is 0.1 to 10 wt %, for example.

A method of producing a plasma display panel of the present invention includes forming a first dielectric layer that covers an electrode by placing a first glass material containing first glass on a substrate on which the electrode has been formed and baking the first glass material. The electrode to be covered with the first dielectric layer contains at least one selected from silver and copper. The first glass contains $Bi_2O_3$. The first glass further contains 0 to 4 wt % of $MoO_3$ and 0 to 4 wt % of $WO_3$, and the total of the contents of $MoO_3$ and $WO_3$ that are contained in the first glass is in a range of 0.1 to 8 wt %.

Hereafter, examples of the method of producing a plasma display panel of the present invention are described.

In the first example of the method of producing a plasma display panel of the present invention, the first glass contains, as components thereof:

0 to 15 wt % $SiO_2$;

10 to 50 wt % $B_2O_3$;

15 to 50 wt % ZnO;

0 to 10 wt % $Al_2O_3$;

2 to 40 wt % $Bi_2O_3$;

0 to 5 wt % MgO;

5 to 38 wt % CaO+SrO+BaO;

0 to 0.1 wt % $Li_2O+Na_2O+K_2O$;

0 to 4 wt % $MoO_3$; and 0 to 4 wt % $WO_3$, and the total of the contents of $MoO_3$ and $WO_3$ that are contained in the first glass is in the range of 0.1 to 8 wt %.

The first example of the method of producing a plasma display panel of the present invention allows the above-mentioned first example of the plasma display panel of the present invention to be produced.

In the second example of the method of producing a plasma display panel of the present invention, the first glass contains, as components thereof:

0 to 2 wt % $SiO_2$;

10 to 50 wt % $B_2O_3$;

15 to 50 wt % ZnO;

0 to 10 wt % $Al_2O_3$;

2 to 40 wt % $Bi_2O_3$;

0 to 5 wt % MgO;

5 to 38 wt % CaO+SrO+BaO;

0 to 4 wt % $MoO_3$; and 0 to 4 wt % $WO_3$, and the total of the contents of $MoO_3$ and $WO_3$ that are contained in the first glass is in the range of 0.1 to 8 wt %. In the second example of the method of producing a plasma display panel, the first glass further may contain, as a component thereof, at least one selected from the group consisting of $Li_2O$, $Na_2O$, and $K_2O$. In this case, the total of the contents of $Li_2O$, $Na_2O$, and $K_2O$ that are contained in the first glass is 0.1 to 10 wt %, for example.

The second example of the method of producing a plasma display panel of the present invention allows the above-mentioned second example of the plasma display panel of the present invention to be produced.

In the third example of the method of producing a plasma display panel of the present invention, the first glass contains, as components thereof:

0 to 15 wt % $SiO_2$;

10 to 50 wt % $B_2O_3$;

15 to 50 wt % ZnO;

0 to 10 wt % $Al_2O_3$;

2 to 40 wt % $Bi_2O_3$;

0 to 5 wt % MgO;

5 to 38 wt % CaO+SrO+BaO;

0 to 4 wt % $MoO_3$; and 0 to 4 wt % $WO_3$, and the total of the contents of $MoO_3$ and $WO_3$ that are contained in the first glass is in a range of 0.1 to 8 wt %. In the third example of the method of producing a plasma display panel, the first glass further may contain, as a component thereof, at least one selected from the group consisting of $Li_2O$, $Na_2O$, and $K_2O$. In this case, the total of the contents of $Li_2O$, $Na_2O$, and $K_2O$ that are contained in the first glass is 0.1 to 10 wt %, for example.

The third example of the method of producing a plasma display panel of the present invention allows the above-mentioned third example of the plasma display panel of the present invention to be produced.

DETAILED DESCRIPTION OF THE INVENTION

Hereinafter, embodiments of the present invention are described. The following description is directed to examples of the present invention and therefore the present invention is not limited thereby.

<PDP>

Figure 1:
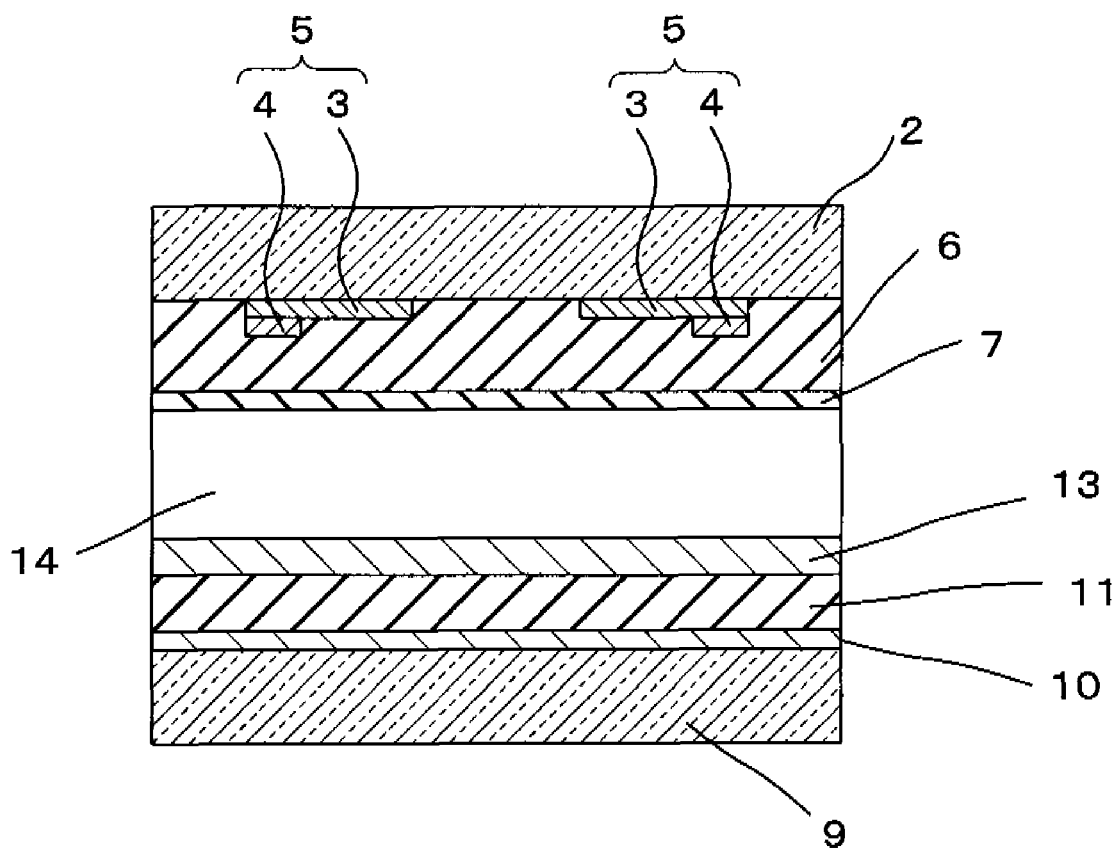
FIG. 1 is a cross-sectional view showing an example of the PDP according to the present invention.
Figure 3:
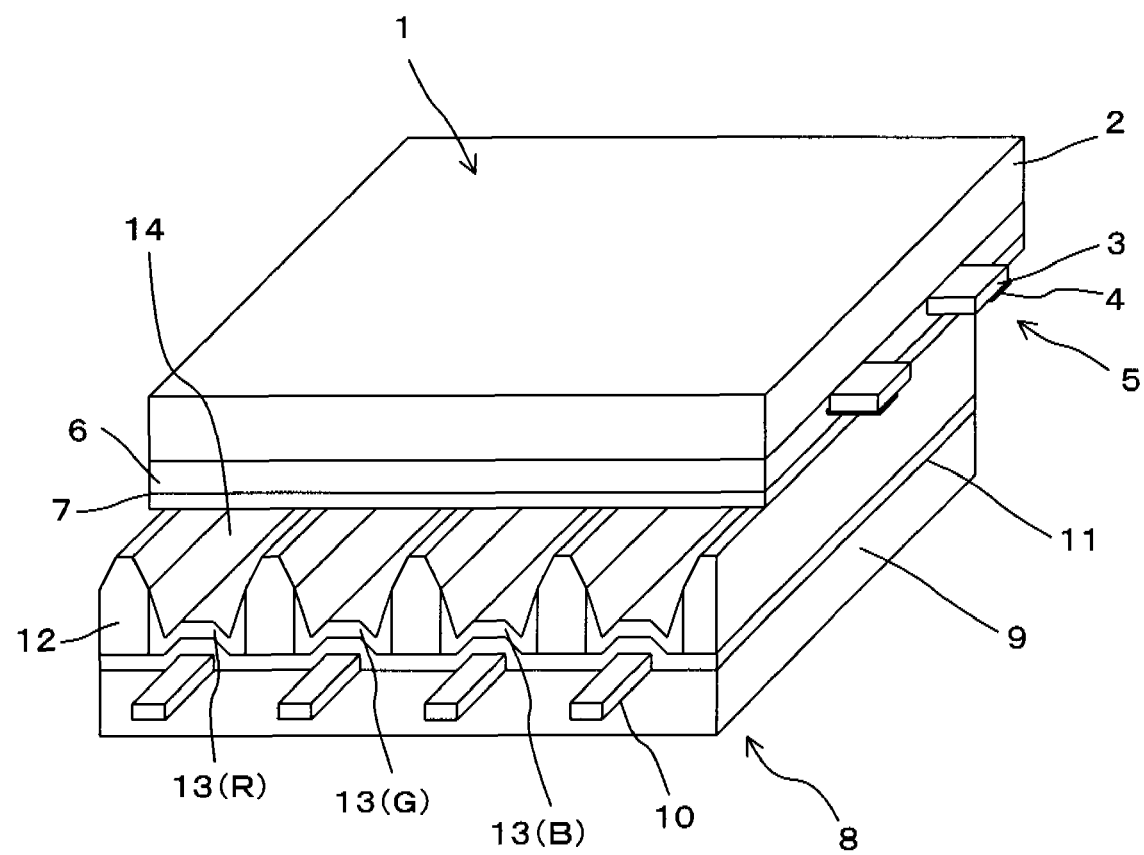
FIG. 3 is a partially cutaway, perspective view showing the configuration of the PDP shown in FIG. 1.

FIG. 3 is a partially cutaway, perspective view showing the main configuration of the PDP according to the present embodiment. FIG. 1 is a cross-sectional view of the PDP shown in FIG. 3.

This PDP is of an AC surface discharge type. This PDP has the same configuration as that of a conventional PDP except that a dielectric layer (a first dielectric layer) covering electrodes is formed of first glass having the composition to be described later.

This PDP is configured with a front panel 1 and a back panel 8 that are bonded to each other. The front panel 1 is provided with a front glass substrate 2, stripe-like display electrodes 5, a dielectric layer (a first dielectric layer) 6 that covers the display electrodes 5, and a dielectric-protecting layer 7 formed of magnesium oxide. Each of the display electrodes 5 is formed of a bus electrode 4 and a transparent conductive film 3 formed on the inner surface (the surface that is located on the side of discharge spaces 14) of the front glass substrate 2. The first glass to be described later is used for the dielectric layer 6.

The back panel 8 is configured with a back glass substrate 9, stripe-like address electrodes 10, a dielectric layer 11 that covers the address electrodes 10, belt-like barrier ribs 12, and phosphor layers 13, each of which is formed between barrier ribs 12 that are adjacent to each other. Each of the address electrodes 10 is formed on the inner surface (the surface that is located on the side of the discharge spaces 14) of the back glass substrate 9. Each of the barrier ribs 12 is provided on the dielectric layer 11 and is arranged between address electrodes 10 that are adjacent to each other. The barrier ribs 12 separate the respective address electrodes 10 from each other and thereby form the discharge spaces 14. In order to allow a color display to be performed, the phosphor layers 13 include a red phosphor layer 13(R), a green phosphor layer 13(G), and a blue phosphor layer 13(B) that are arranged sequentially, with the barrier ribs 12 being interposed therebetween.

Materials such as those described below can be used for the phosphors that form the phosphor layers 13, for example.

| | |
|---|---|
| Blue Phosphors: | $BaMgAl_{10}O_{17}$:Eu |
| Green Phosphors: | $Zn_2SiO_4$:Mn |
| Red Phosphors: | $Y_2O_3$:Eu |

The front panel 1 and the back panel 8 are arranged so that the respective display electrodes 5 and the respective address electrodes 10 are orthogonal to each other in the longitudinal direction thereof and the display electrodes 5 and the address electrodes 10 oppose each other. The front panel 1 and the back panel 8 are joined to each other using a sealing member (not shown). The display electrodes 5 and the address electrodes 10 each are formed of a material containing at least one selected from silver (Ag) and copper (Cu).

The discharge spaces 14 are filled with a discharge gas (a filler gas) that includes rare gas components such as He, Xe, Ne, etc., under a pressure of approximately 53.3 kPa to 79.8 kPa (400 to 600 Torr). Each of the display electrodes 5 is formed with the bus electrode 4 formed of a Ag film or a layered film of Cr/Cu/Cr being stacked on the transparent conductive film 3 formed of ITO (indium tin oxide) or tin oxide in order to obtain good conductivity.

The display electrodes 5 and the address electrodes 10 each are connected to an external drive circuit (not shown). The voltage that is applied from the drive circuit allows electric discharge to occur in the discharge spaces 14. Ultraviolet rays with a short wavelength (a wavelength of 147 nm) that are generated due to the electric discharge excite the phosphors that are contained in the phosphor layers 13 and thereby visible light is emitted.

The dielectric layer 6 can be formed by applying and baking a glass paste (a first glass material) containing the first glass.

More specifically, for example, a glass paste is applied by a screen method or with a bar coater, a roll coater, a die coater, a doctor blade, etc. and then is baked, which is a typical method. However, the method is not limited thereto. For example, the dielectric layer 6 also can be formed by a method of adhering and baking a sheet containing the first glass.

Preferably, the dielectric layer 6 has a thickness of 50 μm or less so as to allow optical transparency to be obtained while having a thickness of at least 1 μm so as to allow insulation to be obtained. It is preferable that the thickness of the dielectric layer 6 be 3 μm to 50 μm, for example.

Although the details of the first glass that is contained in the dielectric layer 6 are described later, the dielectric layer 6 contains at least one selected from $MoO_3$ and $WO_3$ in this embodiment. Hence, even if metal (for example, Ag or Cu) contained in the bus electrode 4 ionizes and disperses in the dielectric layer 6, it is prevented from forming metal colloids. Accordingly, the dielectric layer 6 is prevented from coloring (yellowing) and suffering a decreased withstand voltage.

Furthermore, the problem of yellowing tends to arise particularly prominently when using glass that contains an alkali metal oxide as an alternative component to lead since the glass to be used is substantially free from lead. In this embodiment, however, since the dielectric layer 6 is formed of the glass that contains at least one selected from $MoO_3$ and $WO_3$, yellowing can be prevented from occurring. Hence, according to this embodiment, the dielectric layer 6 can be obtained that is free from lead and is prevented from yellowing.

Moreover, when the dielectric layer 6 is formed using the glass that contains at least one selected from $MoO_3$ and $WO_3$ as described above, the front glass substrate 2 also can be prevented from yellowing. Generally, the glass substrate to be used for a PDP is produced by the float process. The glass substrate produced by the float process contains Sn mixed into the surface thereof. This Sn reproduces Ag ions and Cu ions to produce Ag and Cu colloids. Conventionally, it therefore was necessary to remove Sn by polishing the surface of the glass substrate produced by the float process. On the other hand, in this embodiment, since at least one selected from $MoO_3$ and $WO_3$ that are contained in the dielectric layer 6 prevents Ag and Cu from colloidizing, the glass substrate can be used even if containing Sn that is remaining in the surface thereof. Thus, it is no longer necessary to polish the glass substrate. This allows the number of production steps to be reduced. The content of Sn that is contained (remains) in the glass substrate is 0.001 to 5 wt %, for example.

Figure 2:
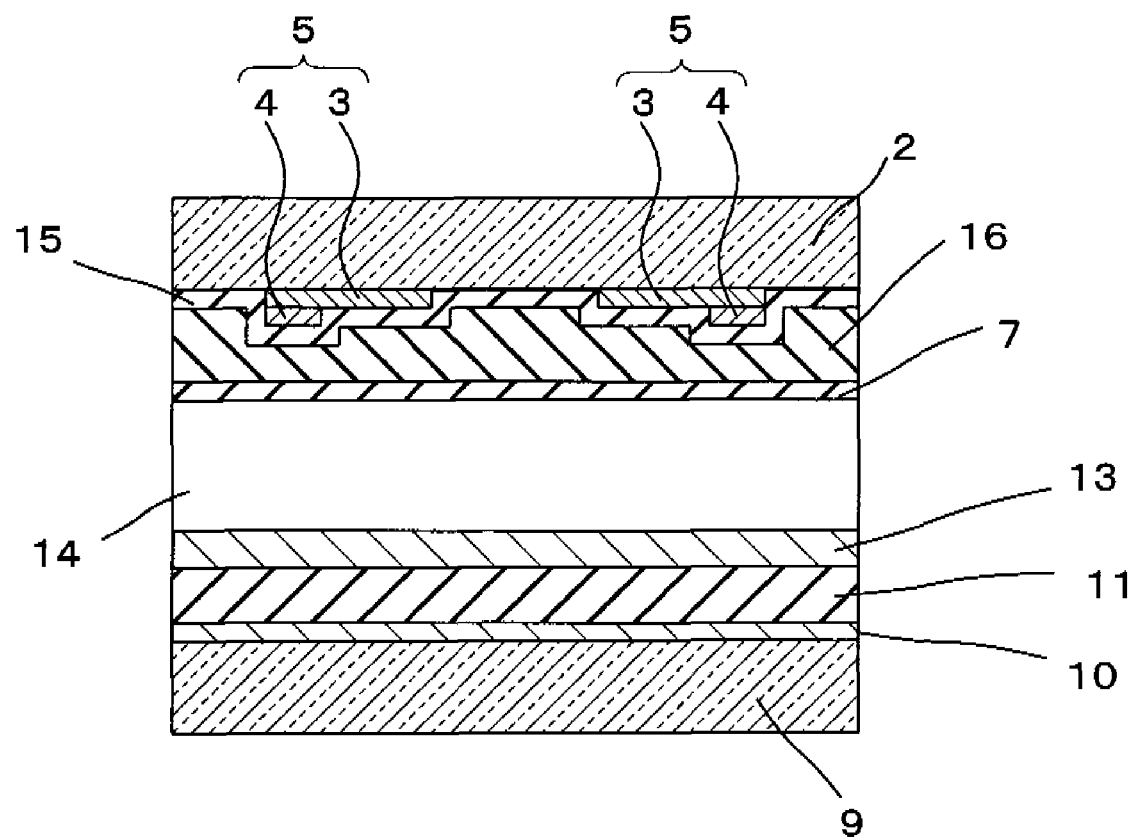
FIG. 2 is a cross-sectional view showing another example of the PDP according to the present invention.

Next, an example of the PDP is described in which a dielectric layer that covers display electrodes 5 has a two-layer structure as shown in FIG. 2.

The PDP shown in FIG. 2 has the same configuration as that of the PDP shown in FIGS. 1 and 3 except that a first dielectric layer 15 that covers the display electrodes 5 and a second dielectric layer 16 disposed on the first dielectric layer 15 are provided instead of the dielectric layer 6. The members that are identical to those of the PDP shown in FIGS. 1 and 3 are indicated with the same numerals, and the descriptions thereof are not repeated.

As shown in FIG. 2, the first dielectric layer 15 and the second dielectric layer 16 are arranged so that the first dielectric layer 15 covers the transparent conductive films 3 and the bus electrodes 4 while the second dielectric layer 16 covers the first dielectric layer 15.

When the dielectric layer has the two-layer structure as described above, at least the first dielectric layer 15 contains first glass in which at least one selected from $MoO_3$ and $WO_3$ is contained and the total of the contents thereof is 0.1 to 8 wt %, as in the case of the dielectric layer 6 of the PDP shown in FIGS. 1 and 3. This can prevent at least the first dielectric layer 15 from yellowing and from having decreased withstand voltage due to deposition of Ag or Cu colloids. Furthermore, the first dielectric layer 15 prevents Ag or Cu ions from diffusing. Hence, even if the second dielectric layer 16 contains glass having a composition that tends to undergo yellowing, the second dielectric layer 16 can be prevented from discoloring (yellowing) or from having a decreased withstand voltage.

Accordingly, any glass composition that meets the specification required for the PDP can be selected to be used for the second dielectric layer 16, without having concerns about the problem of yellowing. Although the details of the second glass that is contained in the second dielectric layer 16 are described later, when, for example, a $SiO_2$—$B_2O_3$—ZnO-based glass composition is used for the second dielectric layer 16, this $SiO_2$—$B_2O_3$—ZnO-based glass has a lower relative dielectric constant than that of lead glass and bismuth-based glass (the relative dielectric constant that is obtained at room temperature and 1 MHz generally is as follows: lead glass: 10 to 15, bismuth-based glass: 8 to 13, and $SiO_2$—$B_2O_3$—ZnO-based glass: 5 to 9). Hence, the use of the $SiO_2$—$B_2O_3$—ZnO-based glass composition for the second dielectric layer 16 allows the relative dielectric constant of the whole dielectric layer (i.e. the dielectric layer including the first dielectric layer 15 and the second dielectric layer 16) to decrease and thereby the power consumption of the PDP can be reduced.

Such a dielectric layer having a two-layer structure can be formed by forming the first dielectric layer 15 and then applying thereon a glass material (a second glass material) containing a glass composition (second glass) to be used for the second dielectric layer 16 and then baking it. In this case, it is preferable that the glass to be used for the first dielectric layer 15 have a higher softening point than that of the glass to be contained in the second dielectric layer.

In order to ensure the insulation and the prevention of interface reactions between the electrodes 3, 4 and the second dielectric layer 16, it is preferable that the thickness of the first dielectric layer 15 be at least 1 μm.

Preferably, the total thickness of the first dielectric layer 15 and the second dielectric layer 16 is 50 μm or less in order to prevent the loss of transmitted light, but is at least 3 μm in order to ensure the insulation.

As described above, in the PDP according to the present embodiment, the use of the above-mentioned first glass makes it possible to form a dielectric layer that is substantially free from lead and to prevent not only the display properties from deteriorating but also the withstand voltage from decreasing due to the discoloration (yellowing) of the dielectric layer.

A PDP of a surface discharge type such as the one described using the present embodiment is a typical example of the PDP to which the present invention is applied. However, the PDP to which the present invention is applied is not limited thereto. The present invention also is applicable to those of an opposed discharge type.

Furthermore, the PDP to which the present invention is applied is not limited to those of the AC type. The present invention is applicable to a PDP that is provided with a dielectric layer even if it is of a DC type.

<First Glass>

The present invention is characterized through the finding of the glass composition of the dielectric layer that can prevent the glass substrate and dielectric layer from yellowing. Three examples (glass (A), glass (B) and glass (C)) of the first glass to be used for the dielectric layer (the first dielectric layer) that covers electrodes in a PDP of the present invention are described below.

In the present embodiment, the glass (A) that is an example of the glass contained in the dielectric layer that covers electrodes contains, as components thereof:

0 to 15 wt % $SiO_2$;

10 to 50 wt % $B_2O_3$;

15 to 50 wt % ZnO;

0 to 10 wt % $Al_2O_3$;

2 to 40 wt % $Bi_2O_3$;

0 to 5 wt % MgO;

5 to 38 wt % CaO+SrO+BaO;

0 to 0.1 wt % $Li_2O+Na_2O+K_2O$;

0 to 4 wt % $MoO_3$; and 0 to 4 wt % $WO_3$, and the total of the contents of $MoO_3$ and $WO_3$ that are contained in the first glass is in the range of 0.1 to 8 wt %.

In the present embodiment, the glass (B) that is another example of the glass contained in the dielectric layer that covers electrodes contains, as components thereof:

0 to 2 wt % $SiO_2$;

10 to 50 wt % $B_2O_3$;

15 to 50 wt % ZnO;

0 to 10 wt % $Al_2O_3$;

2 to 40 wt % $Bi_2O_3$;

0 to 5 wt % MgO;

5 to 38 wt % CaO+SrO+BaO;

0 to 4 wt % $MoO_3$; and 0 to 4 wt % $WO_3$, and the total of the contents of $MoO_3$ and $WO_3$ that are contained in the first glass is in the range of 0.1 to 8 wt %.

In the present embodiment, the glass (C) that is yet another example of the glass contained in the dielectric layer that covers electrodes contains, as components thereof:

0 to 15 wt % $SiO_2$;

10 to 50 wt % $B_2O_3$;

15 to 50 wt % ZnO;

0 to 10 wt % $Al_2O_3$;

2 to 40 wt % $Bi_2O_3$;

0 to 5 wt % MgO;

5 to 38 wt % CaO+SrO+BaO;

0 to 4 wt % $MoO_3$; and 0 to 4 wt % $WO_3$, and the total of the contents of $MoO_3$ and $WO_3$ that are contained in the first glass is in a range of 0.1 to 8 wt %.

The glass (A), the glass (B) and the glass (C) (hereinafter also referred to simply as "glass" or a "glass composition") that have the above-mentioned components each are glass that makes it possible to obtain the characteristics required for the dielectric layer that covers electrodes. Furthermore, they each contain at least one selected from $MoO_3$ and $WO_3$ (the upper limit of the content of each component is 4 wt %) while the total of the contents of $MoO_3$ and $WO_3$ is in the range of 0.1 to 8 wt %. This makes it possible to prevent the dielectric breakdown from occurring and the dielectric layer and the glass substrate from yellowing due to the colloidization of Ag or Cu that is used for the electrodes.

For example, it has been known that when the electrodes are formed of Ag, then Ag and $MoO_3$ tend to produce compounds, such as $Ag_2MoO_4$, $Ag_2Mo_2O_7$, and $Ag_2Mo_4O_{13}$, at low temperatures, specifically 580° C. or lower. Since the temperature at which the dielectric layer is baked is 550° C. to 600° C., it is conceivable that $Ag^+$ that has diffused in the dielectric layer during the baking reacts with $MoO_3$ contained in the dielectric layer to produce the above-mentioned compounds and thereby is stabilized. That is, since $Ag^+$ is stabilized without being reduced, it is prevented from aggregating and forming colloids. Similarly, Ag and $WO_3$ also tend to produce compounds, such as $Ag_2WO_4$, $Ag_2W_2O_7$, and $Ag_2W_4O_{13}$, and thereby $Ag^+$ tends to be stabilized. Accordingly, Ag is prevented from colloidizing.

In the glass containing at least one selected from $MoO_3$ and $WO_3$, $MoO_4^{2-}$ and/or $WO_4^{2-}$ are/is present. $Ag^+$ that has diffused from the electrodes during the baking combines with them and is stabilized. That is, it is conceivable that $Ag^+$ is prevented not only from colloidizing but also from diffusing into the dielectric layer. Similarly, in the case where the electrodes are Cu, it is conceivable that $Cu^+$ is prevented from diffusing.

In order to obtain the effects described above, the total of the contents of $MoO_3$ and $WO_3$ that are contained in the glass is at least 0.1 wt %.

Moreover, when the contents of $MoO_3$ and $WO_3$ in the glass increase, coloring of the glass that is caused by each of the $MoO_3$ and $WO_3$ becomes prominent. Hence, in order not to decrease the transmissivity of the dielectric layer, the contents of $MoO_3$ and $WO_3$ each are 4 wt % or less. Furthermore, as compared to glass that contains either $MoO_3$ or $WO_3$, glass that contains both $MoO_3$ and $WO_3$ makes it possible to further reliably obtain the effects of preventing the loss of transmissivity and decreasing the degree of yellowing. Accordingly, it is preferable that the glass containing both $MoO_3$ and $WO_3$ be used. In the case of glass containing both $MoO_3$ and $WO_3$, the content of each can be up to the upper limit (4 wt %) thereof. Hence, the total of the contents of $MoO_3$ and $WO_3$ is 8 wt % or less.

In the above, the description is directed to the case where $MoO_3$ and/or $WO_3$ are/is mixed into the glass composition. However, mixed powder may be used that contains $MoO_3$ and/or $WO_3$ powder mixed into glass powder. When the mixed powder is placed on the electrodes and then is baked, a certain effect of decreasing the degree of yellowing can be obtained although as compared to the case where $MoO_3$ and/or $WO_3$ are/is mixed into the glass composition, the homogeneity may deteriorate and thereby the transmissivity of the dielectric layer may decrease in some cases.

The effect of decreasing the degree of yellowing that is provided by $MoO_3$ and $WO_3$ also is effective in the dielectric layer that is formed using glass containing PbO as a composition thereof, which has been used conventionally. It, however, is more effective in the dielectric layer formed using glass that is substantially free from lead, i.e. glass that contains 0.1 wt % of lead or less.

The reason is as follows. In order to obtain glass that is free from PbO, which is required conventionally for obtaining a lower softening point, it is necessary for the glass to contain an alkali metal oxide or bismuth oxide as an alternative component. Since such components promote the diffusion of Ag or Cu and facilitate the reduction of ions, the degree of yellowing increases.

Next, the reasons for limiting the compositions of the glass (A), glass (B) and glass (C) are described below.

$SiO_2$ has an effect of stabilizing glass, and the content thereof is 15 wt % or less. If the content of $SiO_2$ exceeds 15 wt %, the softening point increases, which makes it difficult to carry out baking at a predetermined temperature. The content of $SiO_2$ is more preferably 10 wt % or less. Furthermore, in order to allow fewer air bubbles to remain after baking, it is preferable that the glass have a lower viscosity at the time of the baking. For that purpose, it is preferable that the content of $SiO_2$ be 1 wt % or less.

The content of the alkali metal oxides ($Li_2O$, $Na_2O$, and $K_2O$) in the glass (A) is a trace amount, specifically 0.1 wt % or less, or 0 wt % and therefore the glass (A) is substantially free from them. On the other hand, the glass (B) and the glass (C) may contain the alkali metal oxides. For example, it may contain 0.1 wt % to 10 wt % of at least one selected from $Li_2O$, $Na_2O$, and $K_2O$. Glass that contains such alkali metal oxides tends to contain air bubbles that remain therein after baking. Hence, in order to keep the viscosity of the glass low and thereby to prevent air bubbles from remaining, the content of $SiO_2$ is preferably 2 wt % or less. Preferably, the amount of alkali metal oxides contained in the glass (A) is 0.01 wt % or less.

$B_2O_3$ is an essential component of the glass to be used for the dielectric layer of the PDP according to the present embodiment. The content thereof is 10 to 50 wt %. The $B_2O_3$ content exceeding 50 wt % results in deteriorated durability of the glass as well as a decreased thermal expansion coefficient and an increased softening point of the glass. This causes difficulty in carrying out the baking at the predetermined temperature. On the other hand, when the $B_2O_3$ content is less than 10 wt %, the glass becomes unstable and tends to devitrify. The content of $B_2O_3$ is more preferably in the range of 15 to 50 wt %.

ZnO is one of the main components of the glass to be used for the dielectric layer of the PDP according to the present embodiment. ZnO has an effect of stabilizing glass. The ZnO content is 15 to 50 wt %. When the ZnO exceeds 50 wt %, glass tends to crystallize and therefore stable glass cannot be obtained. On the other hand, when the ZnO content is less than 15 wt %, glass has a higher softening point and the baking therefore is difficult to carry out at the predetermined temperature. Furthermore, when the ZnO content is small, the glass tends to devitrify after the baking. Accordingly, in order to obtain stable glass, it is more preferable that the ZnO content be at least 26 wt %. Moreover, in order to reduce the discharge time lag that is a characteristic of a protective layer to be formed on the dielectric layer, the ZnO content is preferably at least 26 wt %, more preferably at least 32 wt %.

$Al_2O_3$ has an effect of stabilizing glass and the content thereof is 10 wt % or less. The $Al_2O_3$ content exceeding 10 wt % may cause devitrification of glass and also results in a higher softening point, which causes difficulty in baking glass at the predetermined temperature. Preferably, the $Al_2O_3$ content is 8 wt % or less but at least 0.01 wt %. When the $Al_2O_3$ content is at least 0.01 wt %, further stable glass can be obtained.

$Bi_2O_3$ is one of the main components of the glass to be used for the dielectric layer of the PDP according to the present embodiment. $Bi_2O_3$ has effects of lowering the softening point and increasing the thermal expansion coefficient. The content thereof is 2 to 40 wt %. When the $Bi_2O_3$ content exceeds 40 wt %, glass tends to crystallize. The $Bi_2O_3$ content exceeding 30 wt % results in a higher thermal expansion coefficient and also results in an excessively high dielectric constant, which increases the power consumption. On the other hand, the $Bi_2O_3$ content of less than 2 wt % results in a higher softening point, which causes difficulty in baking glass at the predetermined temperature. The $Bi_2O_3$ content is more preferably in the range of 2 to 30 wt %.

The alkaline-earth metal oxides, CaO, SrO, and BaO have effects of improving water resistance, preventing phase separation of glass from occurring, and improving the thermal expansion coefficient relatively, for example. The total of the contents thereof is 5 to 38 wt %. When the total of the contents of CaO, SrO, and BaO exceeds 38 wt %, glass may devitrify and may have an excessively high thermal expansion coefficient. On the other hand, when the total thereof is less than 5 wt %, the above-mentioned effects are difficult to obtain.

Preferably, the total of the contents of ZnO and $Bi_2O_3$ (i.e. $ZnO+Bi_2O_3$) is 35 to 65 wt %. In order to produce a dielectric that has a lower softening point and higher transmissivity and does not react with electrodes at a desired temperature that is 600° C. or lower, it is preferable that the total content, ($ZnO+Bi_2O_3$) be at least 35 wt %. However, when the total content exceeds 65 wt %, a problem arises that glass tends to crystallize.

Furthermore, it is preferable that a value of $Bi_2O_3/(B_2O_3+ZnO)$, which is a ratio between the $Bi_2O_3$ content and the total of the contents of $B_2O_3$ and ZnO (i.e. $B_2O_3+ZnO$), be 0.5 or lower. $Bi_2O_3$ allows glass to have a higher dielectric constant as compared to $B_2O_3$ and ZnO. Accordingly, when the above-mentioned range is employed, a dielectric layer with a lower dielectric constant can be formed and thereby the power consumption can be reduced.

In order to prevent the dielectric layer from yellowing, it is preferable that the glass (A) be free from the alkali metal oxides ($Li_2O$, $Na_2O$, and $K_2O$). Accordingly, the glass (A) is substantially free from the alkali metal oxides. That is, the total of the contents of the alkali metal oxides is 0.1 wt % or less, preferably 0.01 wt % or less.

On the other hand, the glass (B) and the glass (C) may contain 0.1 to 10 wt % of at least one selected from $Li_2O$, $Na_2O$, and $K_2O$ although it is preferable that the alkali metal oxides be not contained in order to prevent the dielectric layer from yellowing as described above. When the content of the alkali metal oxides in the glass (B) and the glass (C) is at least 0.1 wt %, the softening point can be lowered and various physical properties can be controlled. For instance, since the softening point can be lowered, the content of $Bi_2O_3$ that has the same effect can be reduced. This allows the relative dielectric constant to decrease. However, it is not preferable that the content of the alkali metal oxides exceed 10 wt % since in that case, the thermal expansion coefficient becomes excessively high. In the glass (B), since the content of $SiO_2$ is 2 wt % or less, the viscosity can further reliably be kept lower and thereby air bubbles can be prevented from remaining therein, even when the alkali metal oxides are contained.

MgO has an effect of stabilizing glass and the content thereof is 5 wt % or less. This is because the MgO content exceeding 5 wt % may cause devitrification during the glass production.

The glass (A), the glass (B) and the glass (C) contain the above-mentioned components and typically consist only of the above-mentioned components, respectively. They may contain other components as long as the effects of the present invention can be obtained. The total of the contents of other components is preferably 10 wt % or less, more preferably 5 wt % or less. Examples of such other components include those to be added for controlling the softening point and thermal expansion coefficient, stabilizing glass, improving chemical durability, etc., specifically, $Rb_2O$, $Cs_2O$, $TiO_2$, $ZrO_2$, $La_2O_3$, $Nb_2O_5$, $TeO_2$, $Ag_2O$, SnO, $CeO_2$, CuO, etc.

The glass (A), the glass (B) and the glass (C) each can be used as the material of a dielectric layer that is suitable for the glass substrate of the PDP. Examples of the common glass substrate to be used for the PDP include soda lime glass that is produced by the float process and is generally readily available window sheet glass, and high distortion point glass that has been developed for PDPs. Such glass generally has a heat resistance up to 600° C. and a thermal expansion coefficient (a linear thermal expansion coefficient) of $75 \times 10^{-7}$ to $85 \times 10^{-7}/°$ C.

The dielectric layer of the PDP is formed by applying a glass paste to a glass substrate and then baking it, for example. It therefore is necessary to carry out the baking at a temperature of 600° C. or lower at which the glass substrate is not softened and does not deform. Furthermore, in order to prevent the glass substrate from warping and the dielectric layer from peeling off and cracking, the glass that forms the dielectric layer is required to have a lower thermal expansion coefficient than that of the glass substrate by approximately 0 to $25 \times 10^{-7}/°$ C. Moreover, it is not preferable that the dielectric layer have a high dielectric constant since in that case, the current that flows through the electrodes increases and thereby the power consumption of the PDP increases.

For this reason, when the dielectric layer of the PDP is formed of lead-free glass that is substantially free from lead, it is preferable that lead-free glass be used that has a composition in the above-mentioned ranges (the composition of the glass (A), the glass (B) or the glass (C)), a softening point of 600° C. or lower, a thermal expansion coefficient of 60 to $85 \times 10^{-7}/°$ C., and a relative dielectric constant of 12 or lower. Furthermore, with consideration given to the prevention of peeling off and cracking that occur due to distortion or the like and to the achievement of a yield of at least 90%, the thermal expansion coefficient is more preferably $65 \times 10^{-7}$ to $85 \times 10^{-7}/°$ C. Moreover, in order to reduce the power consumption further, it is more preferable that the relative dielectric constant be 11 or lower The amount of the glass that is contained in the dielectric layer is not particularly limited, as long as the effects of the present invention are obtained. However, it usually is preferable that the amount be at least 50 wt % (for example, at least 80 wt % or at least 90 wt %). In one example, the dielectric layer may be formed substantially of glass alone. The glass components that compose the dielectric layer in the present embodiment are typically those of the above-mentioned glass (A), glass (B) or glass (C), and the glass components that are contained in the dielectric layer do not include lead.

In the PDP of the present embodiment, when the dielectric layer of the front panel of the PDP is formed using the above-mentioned glass (A), glass (B) or glass (C), an inorganic filler and an inorganic pigment may be added to improve glass strength and to adjust the thermal expansion coefficient, without impairing the optical characteristics. Examples of the inorganic filler and inorganic pigment include alumina, titanium oxide, zirconia, zircon, cordierite, quartz, etc.

The electrode (the address electrode 10 shown in FIG. 1) formed on the back panel of the PDP may be covered using the above-mentioned glass. Similarly in this case, an inorganic filler and an inorganic pigment may be added for the purposes of not only improving the optical characteristics such as the reflection characteristic but also improving the glass strength and adjusting the thermal expansion coefficient. Examples of the inorganic filler and inorganic pigment include alumina, titanium oxide, zirconia, zircon, cordierite, quartz, etc.

<Second Glass>

The glass (second glass) contained in the second dielectric layer is described in detail. The second dielectric layer is a layer that is not in contact with the electrodes when the dielectric layer has a two-layer structure as shown in FIG. 2. Preferably, this second glass contains at least one selected from $Li_2O$, $Na_2O$, and $K_2O$ for the purposes of lowering the softening point and decreasing the relative dielectric constant. If the second dielectric layer is formed of glass that allows such a lower relative dielectric constant to be obtained, the power consumption of the PDP can be reduced. Two examples (glass (D) and glass (E)) of the second glass are described below.

In the present embodiment, the glass (D) that is an example of the glass to be used for forming the second dielectric layer contains, as components thereof:

0 to 15 wt % $SiO_2$;

10 to 50 wt % $B_2O_3$;

15 to 50 wt % ZnO;

0 to 10 wt % $Al_2O_3$;

2 to 40 wt % $Bi_2O_3$;

0.1 to 10 wt % $Li_2O+Na_2O+K_2O$;

0 to 5 wt % MgO; and 5 to 38 wt % CaO+SrO+BaO.

In the present embodiment, the glass (E) that is another example of the glass to be used for forming the second dielectric layer contains, as components thereof:

0 to 30 wt % $SiO_2$;

25 to 80 wt % $B_2O_3$;

0 to 50 wt % ZnO;

0 to 10 wt % $Al_2O_3$;

5 to 20 wt % $Li_2O+Na_2O+K_2O$;

0 to 5 wt % MgO; and 0 to 15 wt % CaO+SrO+BaO.

Both the glass (D) and the glass (E) allow not only a lower softening point but also a lower relative dielectric constant to be obtained. Particularly, the glass (E) is substantially free from $Bi_2O_3$, which is a component to increase the relative dielectric constant, and therefore allows a lower relative dielectric constant to be obtained. Accordingly, when the second dielectric layer is formed using the glass (D) or glass (E), the dielectric layer is allowed to have a lower dielectric constant and thereby the power consumption of the PDP can be reduced.

In addition, combinations of the glasses (A), (B) and (C) that are used for the first dielectric layer 15 and the glasses (D) and (E) that are used for the second dielectric layer 16 are not particularly limited. They can be used in various combinations.

<Glass Paste>

The glass to be used for the dielectric layer of the PDP according to the present embodiment usually is used in the state of powder A glass paste is obtained by adding a binder, a solvent, etc., which are used for providing printability, to the glass powder according to the present embodiment described above. This glass paste is applied to the electrodes formed on the glass substrate and then is baked. Thus a dielectric layer that covers the electrodes can be formed. A dielectric-protecting layer with a predetermined thickness is formed on the dielectric layer using, for example, the electron-beam vapor deposition method. The method of forming the dielectric-protecting layer is not limited to the electron-beam vapor deposition method but may be a sputter method or an ion plating method.

The glass paste contains glass powder, a solvent, and resin (a binder). The glass powder is powder of the glass composition to be used for the dielectric layer of the PDP according to the present embodiment. The glass paste also may contain components other than those mentioned above. For example, the glass paste may contain additives according to various purposes. Examples of the additives include a surfactant, a development accelerator, an adhesive auxiliary, an antihalation agent, a preservation stabilizer, an antifoaming agent, an antioxidant, an ultraviolet absorber, pigments, dye, etc.

The resin (the binder) to be contained in the glass paste is not particularly limited as long as it has lower reactivity to low-melting glass powder From the viewpoints of chemical stability, cost, safety, etc, preferable examples of the resin include cellulose derivatives, such as nitrocellulose, methyl cellulose, ethyl cellulose, and carboxymethyl cellulose, etc., polyvinyl alcohol, polyvinyl butyral, polyethylene glycol, carbonate-based resin, urethane-based resin, acryl-based resin, melamine-based resin, etc.

The solvent to be contained in the glass paste is not particularly limited as long as it has a suitably low reactivity to the glass powder. From the viewpoints of chemical stability, cost, safety, and compatibility with the binder resin, examples of the solvent include: ethylene glycol monoalkyl ethers such as butyl acetate, 3-ethoxy ethyl propionate, ethylene glycol monomethyl ether, ethylene glycol monoethyl ether, ethylene glycol monopropyl ether, ethylene glycol monobutyl ether, etc.; ethylene glycol monoalkyl ether acetates such as ethylene glycol monomethyl ether acetate, ethylene glycol monoethyl ether acetate, etc.; diethylene glycol dialkyl ethers such as diethylene glycol dimethyl ether, diethylene glycol diethyl ether, diethylene glycol dipropyl ether, diethylene glycol dibutyl ether, etc.; propylene glycol monoalkyl ethers such as propylene glycol monomethyl ether, propylene glycol monoethyl ether, propylene glycol monopropyl ether, propylene glycol monobutyl ether, etc.; propylene glycol dialkyl ethers such as propylene glycol dimethyl ether, propylene glycol diethyl ether, propylene glycol dipropyl ether, propylene glycol dibutyl ether, etc.; propylene glycol alkyl ether acetates such as propylene glycol monomethyl ether acetate, propylene glycol monoethyl ether acetate, propylene glycol monopropyl ether acetate, propylene glycol monobutyl ether acetate, etc.; esters of lactic acids such as methyl lactate, ethyl lactate, butyl lactate, etc., and esters of aliphatic carboxylic acids such as methyl formate, ethyl formate, amyl formate, methyl acetate, ethyl acetate, propyl acetate, isopropyl acetate, isobutyl acetate, amyl acetate, isoamyl acetate, hexyl acetate, (2-ethylhexyl) acetate, methyl propionate, ethyl propionate, butyl propionate, methyl butanoate (methyl butyrate), ethyl butanoate (ethyl butyrate), propyl butanoate (propyl butyrate), isopropyl butanoate (isopropyl butyrate), etc.; carbonates such as ethylene carbonate, propylene carbonate, etc.; alcohols such as terpineol, benzyl alcohol, etc.; aromatic hydrocarbons such as toluene, xylene, etc.; ketones such as methyl ethyl ketone, 2-heptanone, 3-heptanone, 4-heptanone, cyclohexanone, etc.; esters such as ethyl 2-hydroxypropionate, 2-hydroxy-2-methyl ethyl propionate, ethoxyethyl acetate, hydroxyethyl acetate, 2-hydroxy-3-methyl methyl butyrate, methyl 3-methoxypropionate, ethyl 3-methoxypropionate, 3-methoxybutyl acetate, 3-methyl-3-methoxybutyl acetate, butyl carbitol acetate, 3-methyl-3-methoxybutyl propionate, 3-methyl-3-methoxybutyl butyrate, 2,2,4-trimethyl-1,3-pentanediol monoisobutylate methyl acetoacetate, ethyl acetoacetate, methylpyruvate, ethyl pyruvate, ethyl benzoate, benzyl acetate, etc.; and amide-based solvents such as N-methylpyrrolidone, NN-dimethylformamide, N-methylformamide, N,N-dimethylacetamide, etc. These solvents can be used individually or two or more of them can be used in combination.

The content of the solvent in the glass paste is adjusted in the range that allows the plasticity or fluidity (viscosity) of the paste to be suitable for the forming process or coating process.

This glass paste also can be used to form the dielectric layer that covers the electrodes formed on the back panel of the PDP.

<PDP Production Method>

An example of the method of producing a PDP is described below.

A method of producing a PDP according to the present embodiment includes forming a dielectric layer (a first dielectric layer) that covers electrodes by: placing a glass material (a first glass material) containing first glass on a substrate on which the electrodes have been formed; and baking the glass material. The first glass to be used herein can be the glass (A), the glass (B) or the glass (C) described above. Here, an example is described in which the above-mentioned process is employed in forming a dielectric layer that covers display electrodes formed on a front panel.

First, a method of producing the front panel is described.

A plurality of transparent electrodes each are formed on one principal plane of a flat front glass substrate in the shape of a stripe. Next, a silver paste is applied onto the transparent electrodes. Thereafter, the whole front glass substrate is heated and thereby the silver paste is baked to form bus electrodes. Thus, the display electrodes are formed.

Subsequently, the glass paste that contains the glass composition to be used for the dielectric layer of the PDP according to the present embodiment is applied to the above-mentioned principal plane of the front glass substrate by the blade coater method so as to cover the display electrodes. Thereafter, the whole front glass substrate is kept at 90° C. for 30 minutes and thereby the glass paste is dried, which then is baked at a temperature in the range of 560 to 590° C. for 10 minutes. Thus, the dielectric layer is formed.

The glass to be used herein for the dielectric layer is the glass (A), glass (B) or glass (C) described above.

Next, a film of magnesium oxide (MgO) is formed on the dielectric layer by the electron-beam vapor deposition method, which then is baked to form a dielectric-protecting layer.

Thus, the front panel is produced.

The method of producing a PDP whose dielectric layer has a two-layer structure as shown in FIG. 2 is as follows. Like the case described above, a glass paste (a first glass material) that contains glass (first glass) to be used for a first dielectric layer is applied to cover the display electrodes and then is dried and baked. Thereafter, a glass paste (a second glass material) that contains glass (second glass) to be used for a second dielectric layer is applied to cover the first dielectric layer formed as described above and then is dried and baked. Thus the second dielectric layer is formed.

Next, a method of producing a back panel is described.

A silver paste is applied to one principal plane of a flat back glass substrate to form a plurality of stripes. Thereafter, the whole back glass substrate is heated and thereby the silver paste is baked. Thus, address electrodes are formed.

Subsequently, a glass paste is applied between adjacent address electrodes. The whole back glass substrate then is heated and thereby the glass paste is baked. Thus, barrier ribs are formed.

Next, phosphor ink of each color, R, G, or B is applied between adjacent barrier ribs. The back glass substrate then is heated to approximately 500° C. and thereby the above-mentioned phosphor ink is baked and a resin component (a binder) and the like contained in the phosphor ink are removed. Thus, phosphor layers are formed.

Next, the front panel and the back panel are bonded to each other using sealing glass. Thereafter, the internal spaces thus sealed are evacuated to a high vacuum and then are charged with rare gas.

Thus, the PDP is obtained. The PDP and the method of producing it that are described above are examples and the present invention is not limited thereto.

EXAMPLES

Hereafter, the present invention is described further in detail using examples.

<Production and Evaluation of Glass>

Glasses that are used for dielectric layers of PDPs of the present invention were produced. The compositions of the glasses (Samples 1 to 36) of the examples that are suitably used for dielectric layers of PDPs of the present invention are indicated in Tables 1 to 4, and the compositions of the glasses (Sample 101 to 121) are indicated in Tables 5 to 7. In the tables, "SiO$_2$" is indicated as "SiO2", for example.

TABLE 1

| Glass Composition/No. | 1 | 2 | 3 | 4 | 5 | 6 | 7 | 8 | 9 | 10 |
|---|---|---|---|---|---|---|---|---|---|---|
| SiO2 | 15.0 | 9.7 | 1.0 | 14.9 | 9.3 | | 12.0 | 1.6 | 1.5 | |
| B2O3 | 27.3 | 29.5 | 30.9 | 10.0 | 15.0 | 50.0 | 24.2 | 30.6 | 23.4 | 26.9 |
| ZnO | 27.0 | 26.8 | 26.0 | 33.6 | 35.7 | 26.0 | 15.0 | 31.8 | 39.7 | 50.0 |
| Al2O3 | 0.3 | 2.7 | 1.7 | 0.7 | 3.2 | 0.7 | 5.1 | 0.8 | 1.1 | 1.3 |
| Bi2O3 | 23.2 | 16.0 | 11.0 | 28.3 | 19.7 | 9.5 | 21.1 | 13.7 | 12.4 | 8.1 |
| MgO | | 1.2 | | | | | | | | |
| CaO | | | 5.5 | 16.9 | 5.4 | | | 1.3 | 5.5 | 2.6 |
| SrO | | | | 1.2 | 4.1 | | | | | 2.2 |
| BaO | 6.4 | 5.6 | 10.5 | 5.6 | 12.5 | 13.7 | 21.0 | 19.7 | 10.1 | 8.4 |
| Li2O | | | | | | | | | | |
| Na2O | | | | | | | | | 1.3 | |
| K2O | | | | | | | | | | |
| MoO3 | 0.8 | 3.0 | 2.0 | | | 0.1 | 0.6 | 0.5 | 2.0 | 0.5 |
| WO3 | | | | 0.3 | 0.5 | | 1.0 | | 3.0 | |
| Glass Transition Point(° C.) | 492 | 493 | 485 | 491 | 492 | 469 | 491 | 477 | 480 | 473 |
| Softening Point(° C.) | 593 | 589 | 581 | 590 | 588 | 572 | 598 | 574 | 576 | 569 |
| Thermal Expansion Coefficient ($\times 10^{-7}$/° C.) | 64 | 64 | 70 | 74 | 72 | 65 | 72 | 71 | 72 | 68 |
| Relative Dielectric Constant | 10.4 | 11.0 | 9.7 | 10.9 | 10.3 | 8.9 | 9.9 | 10.0 | 10.0 | 9.8 |
| Glass Stability | ◎ | ◎ | ◎ | ○ | ◎ | ◎ | ◎ | ◎ | ◎ | ◎ |
| Overall Evaluation | ○ | ○ | ◎ | ○ | ◎ | ◎ | ○ | ◎ | ◎ | ◎ |
| a* | −2.2 | −3.0 | −2.5 | −2.0 | −1.9 | −3.0 | −2.8 | −2.2 | −1.7 | −2.5 |
| b* | 3.1 | 2.2 | 2.4 | 3.5 | 3.2 | 4.5 | 2.5 | 2.9 | 1.8 | 3.9 |

TABLE 2

| Glass Composition/ No. | 11 | 12 | 13 | 14 | 15 | 16 | 17 | 18 | 19 | 20 |
|---|---|---|---|---|---|---|---|---|---|---|
| SiO2 | 10.0 | | 1.2 | 1.6 | 1.1 | 3.8 | 3.5 | 4.0 | 5.6 | 2.0 |
| B2O3 | 25.2 | 31.1 | 24.3 | 24.2 | 35.4 | 27.5 | 28.0 | 15.5 | 18.6 | 30.6 |
| ZnO | 24.0 | 26.6 | 37.9 | 39.0 | 36.3 | 26.0 | 27.5 | 30.1 | 38.8 | 33.6 |
| Al2O3 | 10.0 | 8.0 | 0.1 | | 0.6 | 2.2 | 4.4 | 0.8 | 0.8 | 0.7 |
| Bi2O3 | 25.3 | 24.3 | 15.7 | 13.0 | 2.0 | 18.8 | 30.0 | 40.0 | 23.1 | 19.4 |
| MgO | | | | | | | | | 0.3 | 0.5 |
| CaO | 1.9 | 3.3 | 7.2 | 6.2 | 3.8 | 4.6 | 3.1 | 8.1 | 12.0 | 5.2 |
| SrO | | | 5.2 | 6.8 | 3.0 | | 1.8 | | | |
| BaO | 3.1 | 6.1 | 7.9 | 7.6 | 16.8 | 16.4 | 1.5 | | | 2.5 |
| Li2O | | | | | | | | | 2.0 | |
| Na2O | | | | 1.3 | | | | | | 1.5 |
| K2O | | | | | | | | | | |
| MoO3 | | 0.3 | | 0.3 | 1.0 | | 0.2 | 0.5 | 0.8 | 2.0 |
| WO3 | 0.5 | 0.3 | 0.5 | | | 0.7 | | 1.0 | | |
| Glass Transition Point(° C.) | 490 | 475 | 472 | 479 | 490 | 488 | 461 | 470 | 489 | 472 |
| Softening Point(° C.) | 595 | 582 | 571 | 580 | 592 | 590 | 566 | 565 | 579 | 570 |
| Thermal Expansion Coefficient ($\times 10^{-7}$/° C.) | 64 | 65 | 72 | 73 | 70 | 72 | 72 | 85 | 80 | 68 |
| Relative Dielectric Constant | 10.7 | 10.3 | 10.1 | 10.0 | 8.2 | 10.2 | 10.8 | 12.0 | 11.0 | 10.4 |
| Glass Stability | ○ | ◎ | ◎ | ○ | ◎ | ◎ | ◎ | ◎ | ◎ | ◎ |
| Overall Evaluation | ○ | ◎ | ◎ | ○ | ◎ | ◎ | ◎ | ○ | ◎ | ◎ |
| a* | −2.5 | −1.9 | −2.0 | −1.7 | −1.8 | −2.2 | −2.0 | −2.1 | −1.8 | −2.2 |
| b* | 2.9 | 2.0 | 2.2 | 2.4 | 2.0 | 2.5 | 2.3 | 2.5 | 2.0 | 2.4 |

TABLE 3

| Glass Composition/ No. | 21 | 22 | 23 | 24 | 25 | 26 | 27 | 28 | 29 | 30 |
|---|---|---|---|---|---|---|---|---|---|---|
| SiO2 | 2.7 | 2.5 | 0.8 | 3.4 | 0.8 | 3.2 | 0.3 | 1.4 | 0.6 | 4.5 |
| B2O3 | 32.1 | 37.7 | 29.0 | 36.0 | 29.5 | 33.7 | 26.7 | 32.8 | 28.4 | 17.5 |
| ZnO | 31.1 | 27.6 | 27.1 | 28.6 | 26.4 | 32.6 | 30.2 | 32.1 | 27.8 | 35.0 |
| Al2O3 | 0.3 | 0.3 | 0.6 | 0.7 | 0.8 | 0.5 | 0.5 | 1.5 | 1.0 | |
| Bi2O3 | 23.0 | 26.4 | 3.8 | 25.8 | 3.8 | 24.5 | 3.6 | 26.7 | 3.5 | 29.9 |
| MgO | 5.0 | | | | | | | | | |
| CaO | 4.3 | 5.0 | 38.0 | | | | | 2.5 | 10.8 | 10.7 |
| SrO | | | | 5.0 | 38.0 | | | 0.9 | 4.9 | |
| BaO | 1.0 | | | | | 5.0 | 38.0 | 1.6 | 22.3 | |
| Li2O | | | | | | | | | | 0.1 |
| Na2O | | | | | | | | | | |
| K2O | | | | | | | | | | |
| MoO3 | 0.5 | 0.5 | | 0.5 | | 0.5 | | 0.5 | | 1.0 |
| WO3 | | | 0.7 | | 0.7 | | 0.7 | | 0.7 | 1.3 |
| Glass Transition Point(° C.) | 469 | 470 | 487 | 467 | 491 | 465 | 492 | 461 | 492 | 480 |
| Softening Point(° C.) | 572 | 573 | 585 | 570 | 590 | 568 | 592 | 562 | 590 | 569 |
| Thermal Expansion Coefficient ($\times 10^{-7}$/° C.) | 62 | 64 | 83 | 63 | 84 | 64 | 80 | 63 | 81 | 80 |
| Relative Dielectric Constant | 10.5 | 10.7 | 8.6 | 10.8 | 9.1 | 10.8 | 9.6 | 10.8 | 9.4 | 10.8 |
| Glass Stability | ◎ | ◎ | ○ | ◎ | ○ | ◎ | ○ | ◎ | ○ | ◎ |
| Overall Evaluation | ○ | ○ | ○ | ○ | ○ | ○ | ○ | ○ | ○ | ○ |
| a* | −2.3 | −2.4 | −2.4 | −2.2 | −2.6 | −2.3 | −2.5 | −2.2 | −2.4 | −2.0 |
| b* | 2.8 | 2.7 | 3.0 | 2.8 | 3.3 | 2.8 | 3.1 | 2.7 | 3.0 | 3.1 |

TABLE 4

| Glass Composition/No. | 31 | 32 | 33 | 34 | 35 | 36 |
|---|---|---|---|---|---|---|
| SiO2 | 1.9 | 4.5 | 1.9 | 4.5 | 1.9 | 1.9 |
| B2O3 | 19.0 | 17.5 | 19.0 | 17.5 | 19.0 | 19.0 |
| ZnO | 31.2 | 35.0 | 31.2 | 35.0 | 31.2 | 31.2 |
| Al2O3 | 1.0 | | 1.0 | | 1.0 | 1.0 |
| Bi2O3 | 25.9 | 29.9 | 25.9 | 29.9 | 25.9 | 25.9 |
| MgO | | | | | | |
| CaO | 10.0 | 10.7 | 10.0 | 10.7 | 10.0 | 10.0 |
| SrO | | | | | | |
| BaO | | | | | | |
| Li2O | 10.0 | | | | | 2.0 |
| Na2O | | 0.1 | 10.0 | | | 3.0 |
| K2O | | | | 0.1 | 10.0 | 5.0 |
| MoO3 | 1.0 | 1.0 | 1.0 | 1.0 | 1.0 | 1.0 |
| WO3 | | 1.3 | | 1.3 | | |
| Glass Transition Point(° C.) | 470 | 480 | 472 | 481 | 470 | 471 |
| Softening Point(° C.) | 560 | 570 | 561 | 570 | 567 | 565 |
| Thermal Expansion Coefficient (× 10⁻⁷/° C.) | 84 | 80 | 85 | 81 | 85 | 84 |
| Relative Dielectric Constant | 10.9 | 11.0 | 10.8 | 11.0 | 10.9 | 10.8 |
| Glass Stability | ◎ | ◎ | ◎ | ◎ | ◎ | ◎ |
| Overall Evaluation | ◎ | ○ | ◎ | ○ | ◎ | ◎ |
| a* | −2.5 | −1.8 | −2.2 | −2.0 | −2.3 | −2.4 |
| b* | 3.9 | 3.2 | 4.1 | 2.9 | 3.8 | 3.9 |

TABLE 5

| Glass Composition/No. | 101 | 102 | 103 | 104 | 105 | 106 | 107 | 108 |
|---|---|---|---|---|---|---|---|---|
| SiO2 | 15.1 | 14.9 | | 12.1 | 1.3 | 1.9 | 1.9 | 0.1 |
| B2O3 | 22.4 | 9.8 | 50.2 | 24.4 | 28.4 | 32.2 | 36.3 | 21.1 |
| ZnO | 27.3 | 32.8 | 27.1 | 14.0 | 50.2 | 26.0 | 33.3 | 26.0 |
| Al2O3 | 0.5 | 2.5 | 0.1 | 5.3 | 2.2 | 10.2 | 4.4 | 1.0 |
| Bi2O3 | 29.3 | 29.2 | 8.3 | 18.3 | 6.6 | 19.7 | 1.7 | 40.9 |
| MgO | | | | | | | | |
| CaO | | 4.2 | | | 4.3 | 2.1 | 4.2 | 6.5 |
| SrO | | 0.4 | | | 2.6 | 1.6 | 2.9 | |
| BaO | 5.1 | 5.9 | 14.0 | 21.2 | 4.1 | 6.0 | 15.0 | 4.1 |
| Li2O | | | | 1.2 | | | | |
| Na2O | | | | | | | | |
| K2O | | | | 1.9 | | | | |
| MoO3 | 0.3 | 0.3 | 0.3 | 0.6 | 0.3 | 0.3 | 0.3 | 0.3 |
| WO3 | | | | 1.0 | | | | |
| Glass Transition Point(° C.) | 498 | — | 481 | 493 | — | 499 | 506 | — |
| Softening Point(° C.) | 602 | — | 578 | 605 | — | 601 | 604 | — |
| Thermal Expansion Coefficient (× 10⁻⁷/° C.) | 60 | — | 59 | 73 | — | 62 | 65 | — |
| Relative Dielectric Constant | 10.8 | — | 8.6 | 11.0 | — | 10.1 | 7.9 | — |
| Glass Stability | ○ | X | ○ | Δ | X | ○ | ○ | X |
| Overall Evaluation | Δ | X | Δ | X | X | Δ | Δ | X |

TABLE 6

| Glass Composition/No. | 109 | 110 | 111 | 112 | 113 | 114 | 115 | 116 | 117 | 118 |
|---|---|---|---|---|---|---|---|---|---|---|
| SiO2 | 2.8 | 2.9 | 0.8 | 2.8 | 0.3 | 2.9 | 0.3 | 1.1 | 0.3 | 5.6 |
| B2O3 | 27.5 | 29.3 | 28.8 | 33.4 | 29.9 | 34.3 | 25.9 | 34.4 | 27.1 | 17.0 |
| ZnO | 30.4 | 32.4 | 26.5 | 29.0 | 26.2 | 28.5 | 32.0 | 27.8 | 30.1 | 31.2 |
| Al2O3 | 0.5 | 0.6 | 1.3 | 0.8 | 1.1 | 1.1 | 0.9 | 1.6 | 0.7 | 0.9 |
| Bi2O3 | 27.5 | 29.7 | 3.8 | 29.0 | 4.0 | 28.1 | 2.2 | 30.0 | 3.2 | 25.5 |
| MgO | 6.0 | | | | | | | | | |
| CaO | 5.0 | 4.8 | 38.5 | | | | | 1.8 | 15.0 | 8.0 |
| SrO | | | | 4.7 | 38.2 | | | 1.0 | 9.8 | |
| BaO | | | | | | 4.8 | 38.4 | 2.0 | 13.5 | |
| Li2O | | | | | | | | | | 11.0 |
| Na2O | | | | | | | | | | |
| K2O | | | | | | | | | | |
| MoO3 | 0.3 | 0.3 | 0.3 | 0.3 | 0.3 | 0.3 | 0.3 | 0.3 | 0.3 | 0.8 |
| WO3 | | | | | | | | | | |
| Glass Transition Point(° C.) | — | 468 | — | 462 | — | 458 | 496 | 462 | — | 473 |
| Softening Point(° C.) | — | 564 | — | 561 | — | 560 | 601 | 558 | — | 571 |
| Thermal Expansion Coefficient (× 10⁻⁷/° C.) | — | 59 | — | 58 | — | 58 | 81 | 59 | — | 86 |
| Relative Dielectric Constant | — | 10.8 | — | 10.6 | — | 10.7 | 10.3 | 10.7 | — | 10.0 |
| Glass Stability | X | ○ | X | ○ | X | ○ | Δ | ○ | X | ○ |
| Overall Evaluation | X | Δ | X | Δ | X | Δ | X | Δ | X | Δ |

TABLE 7

| Glass Composition | No. | | |
|---|---|---|---|
| | 119 | 120 | 121 |
| SiO2 | 5.6 | 5.6 | 5.6 |
| B2O3 | 17.0 | 17.0 | 17.0 |
| ZnO | 31.2 | 31.2 | 31.2 |
| Al2O3 | 0.9 | 0.9 | 0.9 |
| Bi2O3 | 25.5 | 25.5 | 25.5 |
| MgO | | | |
| CaO | 8.0 | 8.0 | 8.0 |
| SrO | | | |
| BaO | | | |
| Li2O | | | 3.0 |
| Na2O | 11.0 | | 3.0 |
| K2O | | 11.0 | 5.0 |
| MoO3 | 0.8 | 0.8 | 0.8 |
| WO3 | | | |
| Glass Transition Point(° C.) | 473 | 472 | 473 |
| Softening Point(° C.) | 569 | 570 | 569 |
| Thermal Expansion Coefficient ($\times 10^{-7}/°$ C.) | 86 | 87 | 87 |
| Relative Dielectric Constant | 10.1 | 10.0 | 10.0 |
| Glass Stability | ○ | ○ | ○ |
| Overall Evaluation | Δ | Δ | Δ |

The percentages of the compositions indicated in each table are weight percentages (wt %). Raw materials were mixed together so that the compositions indicated in Tables 1 to 7 were obtained. The raw materials thus mixed together were melted in an electric furnace with a temperature of 1100 to 1200° C. for one hour using a platinum crucible. Thereafter, the molten glass thus obtained was cooled rapidly by being pressed with a brass plate and then glass cullet was produced.

Evaluation of Glass

The softening point of each glass was measured with a macro differential thermal analyzer. Then the value of the second heat absorption peak was employed. The glass transition point and the thermal expansion coefficient were measured with a thermomechanical analyzer with respect to a rod having a size of 4 mm×4 mm×20 mm that was formed from glass cullet that had been remelted. The relative dielectric constant was measured with a LCR meter at a frequency of 1 MHz with respect to a plate having a size of 50 mm×50 mm×3 mm (thickness). The plate was formed from the glass cullet that had been remelted, and had electrodes that had been vapor-deposited on the surface thereof. The glass stability was evaluated through the measurement of variations with a differential thermal analyzer and observation of the presence of crystals with an optical microscope.

Tables 1 to 7 show the evaluation results and overall evaluations. The definitions of "◉", "○", "Δ", and "×" employed to evaluate the glass stability are as follows:

◉: the composition vitrified, no variations that accompany crystallization were observed by differential thermal analysis, and no crystals were observed with the optical microscope;

○: the composition vitrified, and variations that accompany crystallization were observed by the differential thermal analysis but no crystals were observed with the optical microscope;

Δ: the composition vitrified, but variations in enthalpy were observed in the range of temperatures higher than the softening point, and no diffraction peaks generated according to crystals were observed by the X-ray diffraction method but crystals were observed with the optical microscope; and ×: the composition did not vitrify during the glass production.

In Tables 1 to 7, the overall evaluation was made comprehensively with target criteria of a softening point of lower than 600° C., preferably lower than 595° C., a relative dielectric constant of 12 or lower, preferably 11 or lower, and a thermal expansion coefficient in the range of $60 \times 10^{-7}$ to $85 \times 10^{-7}/C.°$, preferably in the range of $65 \times 10^{-7}$ to $85 \times 10^{-7}/C.°$ and further in consideration of stability of the glass to be formed of the compositions concerned.

The definitions of "◉", "○", "Δ", and "×" employed for the overall evaluation are as follows:

◉: the composition allowed glass to be stable, respective values indicating physical properties were within the ranges of the preferable target values, and the respective physical properties were in balance;

○: the composition allowed glass to be stable, and respective values indicating physical properties were within the ranges of the target values, but at least one of the values indicating the physical properties was outside the range of the preferable target values;

Δ: the composition allowed glass to be stable, but at least one of the values indicating the physical properties was outside the range of the target values; and X: the composition did not vitrify and therefore was not available as a glass material.

As is apparent from Tables 1 to 4, each of Samples 1 to 36 of the examples had a thermal expansion coefficient of 60 to $85 \times 10^{-7}/C.°$ in the temperature range of 30 to 300 C.°, a softening point of 600 C.° or lower, and a relative dielectric constant of 12 or lower, and allowed glass to have excellent stability.

With respect to the case of using each glass of Samples 1 to 36 having especially suitable physical properties for a material to be used for the dielectric layer, the coloring condition was determined using a color difference meter. Glass powder and a glass paste were produced by the same methods as in the case of producing a PDP of this example to be described later. This glass paste was applied onto a glass substrate with an electrode pattern formed thereon, and then was baked, which was used as a test piece. The glass substrate used herein was a substrate formed of flat soda lime glass with a thickness of approximately 2.8 mm. The electrode pattern was produced as follows. A material of ITO (transparent electrodes) was applied onto the glass substrate in a predetermined pattern and then was dried. Subsequently, a silver paste that was a mixture of silver powder and an organic vehicle was applied in the form of a plurality of lines. Thereafter, the whole substrate was heated and thereby the silver paste was baked. Thus, the electrode pattern was produced. The application of the glass paste onto the substrate with the electrodes formed as described above was carried out by the blade coater method. Thereafter, this substrate was kept at 90 C.° for 30 minutes, so that the glass paste was dried. This then was baked at a temperature of 570 C.° for 10 minutes. Thus, a dielectric layer was formed. Then, reflected colors were measured using the color difference meter on the back side (the side with no electrodes) of the substrate with the dielectric layer formed as described above. The measurement results are indicated in Tables 1 to 4.

In Tables 1 to 4, "a*" and "b*" are based on the L*a*b* color system. The value of "a*" that increases in the plus direction denotes stronger red, while the value of "a*" that increases in the minus direction denotes stronger green. On the other hand, the value of b* that increases in the plus direction denotes stronger yellow, while the value of "b*" that increases in the minus direction denotes stronger blue. Generally, when the a* value is in the range of −5 to +5 and the b* value also is in the range of −5 to +5, no coloring of the panels is observed. Especially, with respect to yellowing, since the magnitude of the b* value has an effect thereon (in the case of stronger yellowing, the b* value increases in the plus direction), it is preferable that the PDP have a b* value in the range of −5 to +5.

As shown in Tables 1 to 4, with respect to Samples 1 to 36 that are provided with suitable physical properties for the material to be used for the dielectric layer, it was proved that the yellowing problem did not occur.

<Production and Evaluation of PDP>

The production of PDPs and the results of evaluation thereof are described below.

Production of Glass Powder

In order to examine the effect of decreasing the degree of yellowing that is provided through the addition of $MoO_3$ and/or $WO_3$, Samples 51 to 67 of glasses having respective compositions indicated in Tables 8 and 9 were produced, and PDPs with dielectric layers formed using the glasses, respectively, were produced. Then each PDP was evaluated.

TABLE 8

| Glass Composition/No. | 51 | 52 | 53 | 54 | 55 | 56 | 57 | 58 |
|---|---|---|---|---|---|---|---|---|
| SiO2 | 3.10 | 3.10 | 3.10 | 3.09 | 3.07 | 3.01 | 2.98 | 2.95 |
| B2O3 | 17.50 | 17.49 | 17.48 | 17.45 | 17.33 | 16.98 | 16.80 | 16.63 |
| ZnO | 35.00 | 34.98 | 34.97 | 34.89 | 34.64 | 33.94 | 33.60 | 33.24 |
| Al2O3 | 0.50 | 0.50 | 0.50 | 0.50 | 0.49 | 0.49 | 0.48 | 0.48 |
| Bi2O3 | 31.40 | 31.39 | 31.37 | 31.31 | 31.09 | 30.45 | 30.14 | 29.82 |
| CaO | 12.50 | 12.49 | 12.48 | 12.46 | 12.38 | 12.13 | 12.00 | 11.88 |
| MoO3 | | 0.05 | 0.10 | 0.30 | 1.00 | 3.00 | 4.00 | 5.00 |
| WO3 | | | | | | | | |
| Glass Transition Point(° C.) | 472 | 472 | 472 | 473 | 474 | 476 | 479 | 479 |
| Softening Point(° C.) | 569 | 569 | 570 | 570 | 572 | 574 | 577 | 578 |
| Thermal Expansion Coefficient ($\times 10^{-7}$/° C.) | 82 | 82 | 82 | 82 | 82 | 83 | 83 | 83 |
| Relative Dielectric Constant | 11.8 | 11.7 | 11.7 | 11.8 | 11.8 | 11.9 | 11.9 | 11.9 |
| Glass Stability | ⊚ | ⊚ | ⊚ | ⊚ | ⊚ | ⊚ | ⊚ | ○ |
| Overall Evaluation | ○ | ○ | ○ | ○ | ○ | ○ | ○ | X |
| a* | −2.1 | −2.1 | −2.1 | −2.2 | −2.2 | −2.2 | −2.2 | — |
| b* | 6.1 | 6.0 | 4.9 | 4.1 | 3.0 | 2.4 | 2.2 | — |

TABLE 9

| Glass Composition/No. | 59 | 60 | 61 | 62 | 63 | 64 | 65 | 66 | 67 |
|---|---|---|---|---|---|---|---|---|---|
| SiO2 | 3.10 | 3.10 | 3.09 | 3.07 | 3.01 | 2.98 | 2.95 | 2.91 | 2.85 |
| B2O3 | 17.49 | 17.48 | 17.45 | 17.33 | 16.98 | 16.80 | 16.63 | 16.45 | 16.10 |
| ZnO | 34.98 | 34.97 | 34.89 | 34.64 | 33.94 | 33.60 | 33.24 | 32.90 | 32.20 |
| Al2O3 | 0.50 | 0.50 | 0.50 | 0.49 | 0.49 | 0.48 | 0.48 | 0.47 | 0.46 |
| Bi2O3 | 31.39 | 31.37 | 31.31 | 31.09 | 30.45 | 30.14 | 29.82 | 29.52 | 28.89 |
| CaO | 12.49 | 12.48 | 12.46 | 12.38 | 12.13 | 12.00 | 11.88 | 11.75 | 11.50 |
| MoO3 | | | | | | | | 3.00 | 4.00 |
| WO3 | 0.05 | 0.10 | 0.30 | 1.00 | 3.00 | 4.00 | 5.00 | 3.00 | 4.00 |
| Glass Transition Point(° C.) | 472 | 472 | 472 | 474 | 477 | 478 | 480 | 480 | 482 |
| Softening Point(° C.) | 569 | 569 | 570 | 571 | 573 | 575 | 577 | 581 | 584 |
| Thermal Expansion Coefficient ($\times 10^{-7}$/° C.) | 82 | 82 | 82 | 82 | 83 | 82 | 83 | 83 | 84 |
| Relative Dielectric Constant | 11.7 | 11.8 | 11.8 | 11.8 | 11.8 | 11.9 | 11.9 | 12.0 | 12.0 |

TABLE 9-continued

| Glass Composition/ No. | 59 | 60 | 61 | 62 | 63 | 64 | 65 | 66 | 67 |
|---|---|---|---|---|---|---|---|---|---|
| Glass Stability | ⊚ | ⊚ | ⊚ | ⊚ | ⊚ | ⊚ | ○ | ⊚ | ⊚ |
| Overall Evaluation | ○ | ○ | ○ | ○ | ○ | ○ | X | ○ | ○ |
| a* | −2.1 | −2.1 | −2.1 | −2.2 | −2.2 | −2.3 | — | −2.4 | −2.4 |
| b* | 6.1 | 5.0 | 4.5 | 3.8 | 2.9 | 2.7 | — | 2.0 | 1.8 |

Raw materials were mixed together so that the respective compositions indicated in the tables were obtained. Then the raw materials thus mixed together were melted in an electric furnace with a temperature of 1100 to 1200 C.° for one hour using a platinum crucible. Thereafter, glass cullet was produced by a twin-roller method and then was crushed with a ball mill. Thus powder thereof was prepared.

The respective glass powders thus prepared had an average particle diameter of 1.5 to 3.5 µm.

Preparation of Glass Paste

Ethyl cellulose, which was used as resin, and alpha-terpineol, which was used as a solvent, were mixed together in a weight ratio of 5:30, which then was stirred. Thus a solution containing an organic component was prepared. Subsequently, this solution and each of the glass powders indicated in Tables 8 and 9 were mixed together at a weight ratio of 65:35, which then was mixed well and dispersed with three rollers. Thus glass pastes were prepared.

Production of PDP

A material of ITO (transparent electrodes) was applied in a predetermined pattern onto the surface of a front glass substrate formed of flat soda lime glass with a thickness of approximately 2.8 mm and then was dried. Subsequently, a silver paste that was a mixture of silver powder and an organic vehicle was applied in the form of a plurality of lines. Thereafter, this front glass substrate was heated and thereby the silver paste was baked. Thus display electrodes were formed.

The above-mentioned glass paste was applied to the front glass panel on which the display electrodes had been formed, by the blade coater method. Thereafter, the front glass substrate was kept at 90 C.° for 30 minutes, so that the glass paste was dried. This then was baked at a temperature of 570 C.° for 10 minutes. Thus, a dielectric layer was formed.

Furthermore, magnesium oxide (MgO) was deposited on the dielectric layer by the electron-beam vapor deposition method and then was baked. Thus, a protective layer was formed.

On the other hand, the back panel was produced by the following method. First, address electrodes containing silver as its main component were formed into strips on a back glass substrate made of soda lime glass by screen printing. Subsequently, a dielectric layer was formed. Next, barrier ribs were formed on the dielectric layer between adjacent address electrodes. The barrier ribs were formed through a repetition of the screen printing and baking.

Next, phosphor pastes of red (R), green (G), and blue (B) were applied to the side surfaces of the barrier ribs and the surface of the dielectric layer that was exposed between the barrier ribs, and then were dried and baked. Thus phosphor layers were produced.

The front panel and the back panel thus produced were bonded to each other with sealing glass. Thereafter, the discharge spaces were evacuated to a high vacuum (approximately $1 \times 10^{-4}$ Pa) and then were charged with Ne—Xe-based discharge gas so as to have a predetermined pressure. Thus, a PDP was produced.

Evaluation of PDP

With respect to the display surface side of each PDP produced as described above, the coloring condition was determined using the color difference meter. Tables 8 and 9 indicate the measurement results with respect to the PDPs produced using the glasses having the compositions indicated therein as dielectric layers, respectively. In the tables, "a*" and "b*" used therein denote the same meanings as those indicated in Tables 1 to 4. Since yellowing is affected by the magnitude of the b* value, it is preferable that the PDPs each have a b* value in the range of −5 to +5.

In Sample 51 as well as Samples 52 and 59, the b* value exceeded 5 and yellowing was observed. Sample 51 contained neither $MoO_3$ nor $WO_3$. In Samples 52 and 59, either $MoO_3$ or $WO_3$ was contained but the content thereof was 0.05 wt %. Furthermore, in Samples 58 and 65 in which either $MoO_3$ or $WO_3$ was contained but the content thereof was 5 wt %, glass became clouded and therefore the coloring thereof could not be measured. On the other hand, in Samples 53 to 57 as well as 60 to 64 in which either $MoO_3$ or WO was contained and the content thereof was 0.1 wt % to 4 wt %, the b* value was 5 or smaller and thus it was proved that yellowing was prevented from occurring. Moreover, in each of Samples 66 and 67 that contained both $MoO_3$ and $WO_3$, the b* value was smaller than those of other samples and thus it was proved that they had a higher effect of preventing yellowing from occurring as compared to the cases where only one of them was contained.

Figure 4:
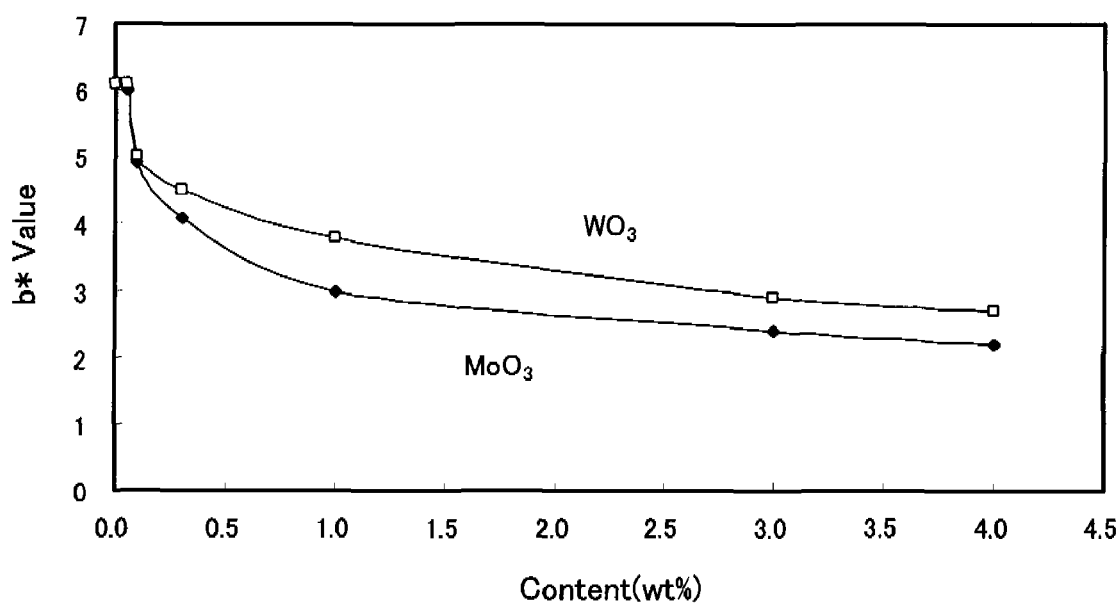
FIG. 4 is a graph showing the relationship between the content of $MoO_3$ or $WO_3$ and the b* value.

FIG. 4 shows the relationship between the content of $MoO_3$ or $WO_3$ and the measurement result of the b* value. As can be seen from the results, the b* value decreases with an increase in content of $MoO_3$ or $WO_3$ and becomes +5 or smaller, with the content of $MoO_3$ or $WO_3$ being at least 0.1 wt %. Thus it was proved that the yellowing problem was alleviated.

Furthermore, with respect to the panels in which the content of $MoO_3$ or $WO_3$ was at least 0.1 wt % and the b* value was lower, the dielectric breakdown of the dielectrics did not occur even when the PDPs were operated.

The examples of the PDP described above each are an example whose dielectric layer is formed of one layer. However, the same evaluation results were obtained even when the dielectric layer having a two-layer structure was employed that was obtained by using the above-mentioned dielectric layer as a first dielectric layer and forming a second dielectric layer thereon. Examples of the compositions of glasses (the second glass (glass (D) and glass (E))) to be used for the second dielectric layer in this case are indicated in Table 10.

TABLE 10

| Glass Composition | Example of Glass (D) | Example of Glass (E) |
|---|---|---|
| SiO2 | 11.10 | 11.80 |
| B2O3 | 22.80 | 36.40 |
| ZnO | 17.50 | 37.20 |
| Al2O3 | 4.50 | 1.60 |
| Bi2O3 | 25.00 | |
| BaO | 16.80 | |
| Li2O | 2.30 | |
| K2O | | 13.00 |

A plasma display panel of the present invention is suitably applicable to a plasma display panel in which a dielectric layer that is used to cover display electrodes and address electrodes is formed of glass that is free from lead. This makes it possible to obtain a highly reliable plasma display panel in which yellowing and dielectric breakdown are prevented from occurring.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein

What is claimed is:

1. A plasma display panel comprising a display electrode and an address electrode that cross each other, at least one selected from the display electrode and the address electrode being covered with a first dielectric layer containing first glass,
   wherein the electrode to be covered with the first dielectric layer contains at least one element selected from the group consisting of silver and copper,
   the first glass contains $Bi_2O_3$,
   the first glass further contains 0 to 4 wt % of $MoO_3$ and 0 to 4 wt % of $WO_3$, and a total content of $MoO_3$ and $WO_3$ that are contained in the first glass is in a range of 0.1 to 8 wt %, and
   a content of lead in the first glass is 0.1 wt % or less.

2. The plasma display panel according to claim 1, wherein the content of $Bi_2O_3$ in the first glass is 2 to 40 wt %.

3. The plasma display panel according to claim 1, wherein the first glass contains, as components thereof:
   0 to 15 wt % $SiO_2$;
   10 to 50 wt % $B_2O_3$;
   15 to 50 wt % $ZnO$;
   0 to 10 wt % $Al_2O_3$;
   2 to 40 wt % $Bi_2O_3$;
   0 to 5 wt % $MgO$;
   5 to 38 wt % $CaO+SrO+BaO$;
   0 to 0.1 wt % $Li_2O+Na_2O+K_2O$;
   0 to 4 wt % $MoO_3$; and
   0 to 4 wt % $WO_3$.

4. The plasma display panel according to claim 1, wherein the first glass contains, as components thereof:
   0 to 2 wt % $SiO_2$;
   10 to 50 wt % $B_2O_3$;
   15 to 50 wt % $ZnO$;
   0 to 10 wt % $Al_2O_3$;
   2 to 40 wt % $Bi_2O_3$;
   0 to 5 wt % $MgO$;
   5 to 38 wt % $CaO+SrO+BaO$;
   0 to 4 wt % $MoO_3$; and
   0 to 4 wt % $WO_3$.

5. The plasma display panel according to claim 4, wherein the first glass further contains, as a component thereof, at least one selected from the group consisting of $Li_2O$, $Na_2O$, and $K_2O$, and
   a total content of $Li_2O$, $Na_2O$, and $K_2O$ that are contained in the first glass is 0.1 to 10 wt %.

6. The plasma display panel according to claim 1, further comprising a second dielectric layer that is provided on the first dielectric layer.

7. The plasma display panel according to claim 6, wherein the second dielectric layer contains second glass, and
   the second glass contains, as a component thereof, at least one selected from the group consisting of $Li_2O$, $Na_2O$, and $K_2O$.

8. The plasma display panel according to claim 7, wherein the second glass contains, as components thereof:
   0 to 15 wt % $SiO_2$;
   10 to 50 wt % $B_2O_3$;
   15 to 50 wt % $ZnO$;
   0 to 10 wt % $Al_2O_3$;
   2 to 40 wt % $Bi_2O_3$;
   0.1 to 10 wt % $Li_2O+Na_2O+K_2O$;
   0 to 5 wt % $MgO$; and
   5 to 38 wt % $CaO+SrO+BaO$.

9. The plasma display panel according to claim 7, wherein the second glass contains, as components thereof:
   0 to 30 wt % $SiO_2$;
   25 to 80 wt % $B_2O_3$;
   0 to 50 wt % $ZnO$;
   0 to 10 wt % $Al_2O_3$;
   5 to 20 wt % $Li_2O+Na_2O+K_2O$;
   0 to 5 wt % $MgO$; and
   0 to 15 wt % $CaO+SrO+BaO$.

10. The plasma display panel according to claim 1, wherein the electrode to be covered with the first dielectric layer is formed on a glass substrate, and
    the glass substrate contains Sn.

11. The plasma display panel according to claim 1, wherein the first glass contains, as components thereof:
    0 to 15 wt % $SiO_2$;
    10 to 50 wt % $B_2O_3$;
    15 to 50 wt % $ZnO$;
    0 to 10 wt % $Al_2O_3$;
    2 to 40 wt % $Bi_2O_3$;
    0 to 5 wt % $MgO$;
    5 to 38 wt % $CaO+SrO+BaO$;
    0 to 4 wt % $MoO_3$; and
    0 to 4 wt % $WO_3$.

12. The plasma display panel according to claim 11, wherein the first glass further contains, as a component thereof, at least one selected from the group consisting of $Li_2O$, $Na_2O$, and $K_2O$, and
    a total content of $Li_2O$, $Na_2O$, and $K_2O$ that are contained in the first glass is 0.1 to 10 wt %.

13. A method of producing a plasma display panel, the method comprising forming a first dielectric layer that covers an electrode by placing a first glass material containing first glass on a substrate on which the electrode has been formed and baking the first glass material,
    wherein the electrode to be covered with the first dielectric layer contains at least one element selected from the group consisting of silver and copper,
    the first glass contains $Bi_2O_3$, the first glass further contains 0 to 4 wt % of MoO$_3$ and 0 to 4 wt % of WO$_3$, and a total content of MoO$_3$ and WO$_3$ that are contained in the first glass is in a range of 0.1 to 8 wt % and a content of lead in the first glass is 0.1 wt % or less.

14. The method of producing a plasma display panel according to claim 13, wherein the content of Bi$_2$O$_3$ in the first glass is 2 to 40 wt %.

15. The method of producing a plasma display panel according to claim 13, wherein the first glass contains, as components thereof:
0 to 15 wt % SiO$_2$;
10 to 50 wt % B$_2$O$_3$;
15 to 50 wt % ZnO;
0 to 10 wt % Al$_2$O$_3$;
2 to 40 wt % Bi$_2$O$_3$;
0 to 5 wt % MgO;
5 to 38 wt % CaO+SrO+BaO;
0 to 0.1 wt % Li$_2$O+Na$_2$O+K$_2$O;
0 to 4 wt % MoO$_3$; and
0 to 4 wt % WO$_3$.

16. The method of producing a plasma display panel according to claim 13, wherein the first glass contains, as components thereof:
0 to 2 wt % SiO$_2$;
10 to 50 wt % B$_2$O$_3$;
15 to 50 wt % ZnO;
0 to 10 wt % Al$_2$O$_3$;
2 to 40 wt % Bi$_2$O$_3$;
0 to 5 wt % MgO;
5 to 38 wt % CaO+SrO+BaO;
0 to 4 wt % MoO$_3$; and
0 to 4 wt % WO$_3$.

17. The method of producing a plasma display panel according to claim 16, wherein the first glass further contains, as a component thereof, at least one selected from the group consisting of Li$_2$O, Na$_2$O, and K$_2$O, and
a total content of Li$_2$O, Na$_2$O, and K$_2$O that are contained in the first glass is 0.1 to 10 wt %.

18. The method of producing a plasma display panel according to claim 13, further comprising forming a second dielectric layer by placing a second glass material containing second glass on the first dielectric layer and baking the second glass material.

19. The method of producing a plasma display panel according to claim 18, wherein the second glass contains, as a component thereof, at least one selected from the group consisting of Li$_2$O, Na$_2$O, and K$_2$O.

20. The method of producing a plasma display panel according to claim 18, wherein the second glass contains, as components thereof:
0 to 15 wt % SiO$_2$;
10 to 50 wt % B$_2$O$_3$;
15 to 50 wt % ZnO;
0 to 10 wt % Al$_2$O$_3$;
2 to 40 wt % Bi$_2$O$_3$;
0.1 to 10 wt % Li$_2$O+Na$_2$O+K$_2$O;
0 to 5 wt % MgO; and
5 to 38 wt % CaO+SrO+BaO.

21. The method of producing a plasma display panel according to claim 19, wherein the second glass contains, as components thereof:
0 to 30 wt % SiO$_2$;
25 to 80 wt % B$_2$O$_3$;
0 to 50 wt % ZnO;
0 to 10 wt % Al$_2$O$_3$;
5 to 20 wt % Li$_2$O+Na$_2$O+K$_2$O;
0 to 5 wt % MgO; and
0 to 15 wt % CaO+SrO+BaO.

22. The method of producing a plasma display panel according to claim 13, wherein the substrate is a glass substrate, and the glass substrate contains Sn.

23. The method of producing a plasma display panel according to claim 13, wherein the first glass contains, as components thereof:
0 to 15 wt % SiO$_2$;
10 to 50 wt % B$_2$O$_3$;
15 to 50 wt % ZnO;
0 to 10 wt % Al$_2$O$_3$;
2 to 40 wt % Bi$_2$O$_3$;
0 to 5 wt % MgO;
5 to 38 wt % CaO+SrO+BaO;
0 to 4 wt % MoO$_3$; and
0 to 4 wt % WO$_3$.

24. The method of producing a plasma display panel according to claim 23, wherein the first glass further contains, as a component thereof, at least one selected from the group consisting of Li$_2$O, Na$_2$O, and K$_2$O, and
a total of the content of Li$_2$O, Na$_2$O, and K$_2$O that are contained in the first glass is 0.1 to 10 wt %.

* * * * *

UNITED STATES PATENT AND TRADEMARK OFFICE
CERTIFICATE OF CORRECTION

PATENT NO. : 7,834,551 B2  
APPLICATION NO. : 11/555495  
DATED : November 16, 2010  
INVENTOR(S) : Hasegawa et al.

Page 1 of 1

It is certified that error appears in the above-identified patent and that said Letters Patent is hereby corrected as shown below:

Title page under item (56), References Cited, Other Publications

In the 1st item listed, "Specification for co-pending U.S. Appl. No. 11/465,046, filed Aug. 16, 2006" should read --U.S. Appl. No. 11/465,048--.

In the 2nd item listed, Shelby et al.: "Journal or" should read --Journal of--.

Column 29, line 51 (claim 3): "15 to 50 wt% $Zn_O$" should read --15 to 50 wt% ZnO--.

Column 31, line 4 (claim 13): "8 wt% and a content of lead in the first glass is 0.1 wt% or less" should read --8 wt%, and a content of lead in the first glass is 0.1 wt% or less--.

Signed and Sealed this  
Twenty-eighth Day of June, 2011

David J. Kappos  
*Director of the United States Patent and Trademark Office*